United States Patent
Ghanma et al.

(10) Patent No.: US 7,719,981 B2
(45) Date of Patent: May 18, 2010

(54) ADAPTIVE TRANSMISSION IN MULTI-ACCESS ASYNCHRONOUS CHANNELS

(75) Inventors: Wael Hani Ghanma, Colleyville, TX (US); Jerry W. Sessom, Euless, TX (US)

(73) Assignee: Bitbytebit Information Services, Inc., Corrales, NM (US)

( * ) Notice: Subject to any disclaimer, the term of this patent is extended or adjusted under 35 U.S.C. 154(b) by 1620 days.

(21) Appl. No.: 10/884,641

(22) Filed: Jul. 2, 2004

(65) Prior Publication Data

US 2005/0111477 A1    May 26, 2005

Related U.S. Application Data

(63) Continuation of application No. 09/342,856, filed on Jun. 29, 1999, now Pat. No. 6,760,308.

(51) Int. Cl.
*H04J 3/16* (2006.01)
*H04B 7/212* (2006.01)
*H04L 12/413* (2006.01)

(52) U.S. Cl. .............. 370/235; 370/337; 370/347; 370/442; 370/445; 370/468

(58) Field of Classification Search ........... 370/235, 370/337, 347, 442, 447, 468
See application file for complete search history.

(56) References Cited

U.S. PATENT DOCUMENTS

| | | | |
|---|---|---|---|
| 4,637,014 A | 1/1987 | Bell et al. | |
| 4,763,321 A | 8/1988 | Calvignac et al. | |
| 4,803,485 A | 2/1989 | Rypinski | |
| 5,107,492 A | 4/1992 | Roux et al. | |
| 5,229,993 A | 7/1993 | Foudriat et al. | |
| 5,315,590 A | 5/1994 | Vijeh et al. | |
| 5,361,261 A | 11/1994 | Edem et al. | |
| 5,371,734 A | 12/1994 | Fischer | |
| 5,539,730 A * | 7/1996 | Dent | 370/280 |
| 5,546,392 A | 8/1996 | Boal et al. | |
| 5,566,169 A | 10/1996 | Rangan et al. | |
| 5,570,355 A | 10/1996 | Dail et al. | |
| 5,572,517 A | 11/1996 | Safadi | |
| 5,638,371 A | 6/1997 | Raychaudhuri et al. | |
| 5,696,765 A | 12/1997 | Safadi | |
| 5,737,335 A | 4/1998 | Mizuta et al. | |
| 5,761,430 A | 6/1998 | Gross et al. | |

(Continued)

*Primary Examiner*—Alpus H Hsu

(57) ABSTRACT

A hybrid transmission cycle (HTC) unit of bandwidth on a shared transmission medium is defined to include an adaptive, time division multiplexing transmission cycle (ATTC), which is allocated in portions sequentially among all participating network entities, and a residual transmission cycle (RTC), which is allocated in portions, as available, to the first network entity requesting access to the shared medium during each particular portion. The ratio of logical link virtual channels, or D-Channels, to data payload virtual channels, or B-Channels, within the ATTC is adaptive depending on loading conditions. Based on transmission profiles transmitted on the D-Channels during the ATTC, each network entity determines how many B-Channels it will utilize within the current HTC. This calculation may be based on any decision network, such as a decision network modelling the transmission medium as a marketplace and employing microeconomic principles to determine utilization. The ratio of the duration of the ATTC segment to the duration of the RTC segment is also adaptive depending on loading conditions, to prevent unacceptable latency for legacy network entities employing the shared transmission medium. During the RTC, utilization of the shared medium preferably reverts to IEEE 802.3 compliant CSMA/CD transmission, including transmissions by HTC-compliant network entities.

8 Claims, 18 Drawing Sheets

U.S. PATENT DOCUMENTS

| | | |
|---|---|---|
| 5,784,569 A | 7/1998 | Miller et al. |
| 5,805,597 A | 9/1998 | Edem |
| 5,883,884 A * | 3/1999 | Atkinson .................... 370/279 |
| 6,049,549 A | 4/2000 | Ganz et al. |
| 6,134,248 A | 10/2000 | Kawasaki et al. |
| 6,198,728 B1 | 3/2001 | Hylyalkar et al. |
| 6,784,890 B1 * | 8/2004 | Bergeson et al. ............ 345/535 |
| 7,460,514 B2 * | 12/2008 | Ganz et al. .................. 370/346 |

* cited by examiner

ADAPTIVE TRANSMISSION IN MULTI-ACCESS ASYNCHRONOUS CHANNELS

This application is a continuation of prior application Ser. No. 09/342,856 filed on Jun. 29, 1999 now U.S. Pat. No. 6,760,308, and which is incorporated herein by reference.

BACKGROUND OF THE INVENTION

1. Field of the Invention

The present invention relates generally to communication between multiple devices over a single, shared transmission medium, and more specifically to employing an adaptive medium access control protocol together with a corresponding logical link control protocol supporting adaptive channel allocation to improve device communication over a shared transmission medium.

2. Description of the Prior Art

Several access control methodologies exist for transmission on multi-access channels within a single transmission medium. Token ring and token bus schemes control access to the transmission medium in an orderly fashion designed to maximize bandwidth utilization and to maintain fairness (priorities) and determinism. Token ring and token bus schemes may be viewed as forms of multiplexing (MUXing), which may be loosely defined as combining two or more information channels onto a common transmission medium. Based on the premise that a transmission medium's speed and capacity far exceed a single user's requirements on any end of the communication medium, and the logical conclusion that several transmitting entities may be able to utilize the same transmission medium, multiplexing typically divides the medium transmission time into "timeslots". Each timeslot is then uniquely assigned to a single transmitting entity, which owns the medium for the full duration of the timeslot and may transmit on the medium only during that assigned portion of time, and is the only transmitting entity permitted to transmit during that assigned portion of time. Time division multiplexing (TDM) thus achieves shared access to a single transmission medium by defined division of transmission time among the transmitting entities. In environments where usage requirements of transmitting entities may vary significantly at run time, statistical time division multiplexing (STDM), in which timeslot duration is not predetermined or fixed but instead varies at run time, may alternatively be employed.

Ethernet-type medium access control schemes, on the other hand, generally allow a network element to transmit at will on the transmission medium. While non-deterministic in nature, this system possesses several attractive characteristics, including simplicity, support for dynamic changes in network element population, autonomous network element operation, low transmission latency at low utilization levels, and acceptable throughput under average loading conditions. Drawbacks of Ethernet include degradation of throughput under heavy traffic loading, non-determinism, and absence of priority assurance. Ethernet throughput rates are typically in the range of 20% to 50% depending on the specific implementation, and drop drastically from those levels when the transmission medium is heavily loaded. Current Ethernet transmission medium access control utilizes the truncated binary exponential back-off algorithm, a simple algorithm by which a transmission controller chip may adapt access to the medium according to the medium loading condition. The basic outcome of the algorithm is minimal latency and acceptable throughput and utilization under light loading conditions, with increased latency and acceptable throughput and bandwidth utilization as traffic increases towards heavy traffic conditions.

It would be desirable, therefore, to provide a shared medium control access methodology which exploits the benefits of Ethernet-type systems while providing some levels of determinism, priority, and sustained throughput efficiency with increasing traffic loads. It would also be advantageous for the methodology to conduct adaptive channel allocation of transmission jobs into virtual channels on the medium.

SUMMARY OF THE INVENTION

A hybrid transmission cycle (HTC) unit of bandwidth on a shared transmission medium is defined to include an adaptive, time division multiplexing transmission cycle (ATTC), which is allocated in portions sequentially among all participating network entities, and a residual transmission cycle (RTC), which is allocated in portions, as available, to the first network entity requesting access to the shared medium during each particular portion. The ratio of logical link virtual channels, or D-Channels, to data payload virtual channels, or B-Channels, within the ATTC is adaptive depending on loading conditions. Based on transmission profiles transmitted on the D-Channels during the ATTC, each network entity determines how many B-Channels it will utilize within the current HTC. This calculation may be based on any decision network, such as a decision network modelling the transmission medium as a marketplace and employing microeconomic principles to determine utilization. The ratio of the duration of the ATTC segment to the duration of the RTC segment is also adaptive depending on loading conditions, to prevent unacceptable latency for legacy network entities employing the shared transmission medium. During the RTC, utilization of the shared medium preferably reverts to IEEE 802.3 compliant CSMA/CD transmission, including transmissions by HTC-compliant network entities.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIGS. 8A-8K are plots from simulations of a shared transmission medium utilizing standard 802.3 compliant and/or HTC-compliant network communications under various conditions and combinations of network elements.

DESCRIPTION OF THE PREFERRED EMBODIMENT

Figure 1:
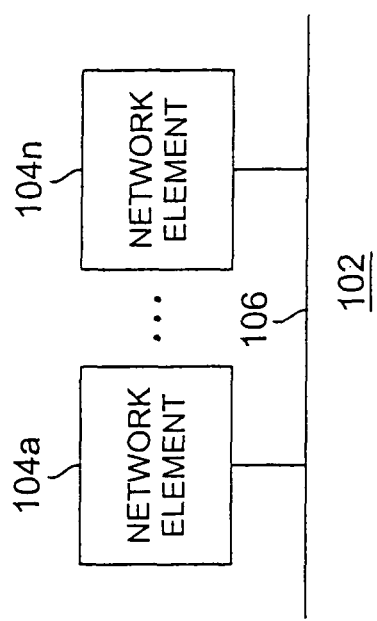
FIG. 1 depicts a block diagram of a network in which a preferred embodiment of the present invention may be implemented.

With reference now to the figures, and in particular with reference to FIG. 1, a block diagram of a network in which a preferred embodiment of the present invention may be implemented is depicted. Network 102 includes a plurality of network entities 104a-104n coupled to a shared transmission medium 106. Network entities 104a-104n may be data processing systems including network interface cards or adapters, or may be communications devices such as telephone handsets or the like. Shared transmission medium 106 may be coaxial cable, RJ-11 wiring, line-of-sight radio frequency (RF) spectrum, or some similar wired or wireless transmission medium. While not limited, the number of network entities 104a-104n which share a single network transmission medium 106, should be reasonable. An excessive number (e.g., 500 or more) of network entities 104a-104n within a single network 102 will, even when they have nothing to transmit, waste significant bandwidth in the present invention.

Figure 2:
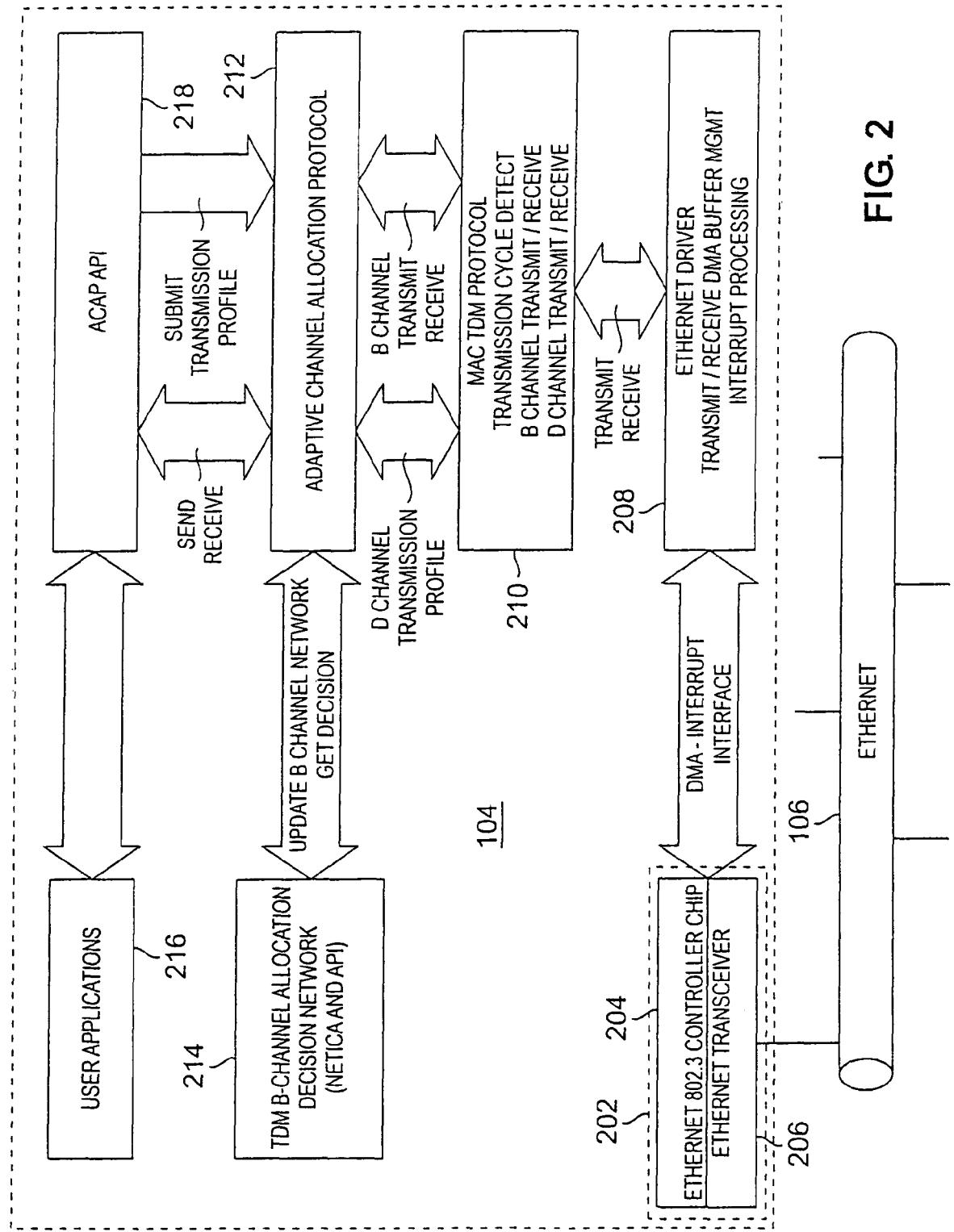
FIG. 2 is a system architecture diagram for a network element in accordance with a preferred embodiment of the present invention.

Referring to FIG. 2, which is intended to be considered in conjunction with FIG. 1, a system architecture diagram for a network element in accordance with a preferred embodiment of the present invention is illustrated. At the physical layer 202, network entity 104 includes an Ethernet controller chip 204 which interfaces directly with the Ethernet transceiver 206 and the shared transmission medium (e.g., wire) 106. Ethernet controller chip 204 generally conforms to the Ethernet standard, with the exception of differences specifically noted below, and is controlled by an Ethernet software driver 208, which interfaces with controller chip 204 by Direct Memory Access (DMA) and interrupt processing, a standard technique for implementing Ethernet controllers and corresponding driver software.

Ethernet controller chip 204 and Ethernet software driver 208 utilize the IEEE 802.3 Carrier Sense Multiple Access with Collision Detect (CSMA/CD) mechanism for controlling access to shared transmission medium 106. Any transmission medium employed by several transmitting entities requires a method of controlling access to the shared medium to ensure that only one transmitting entity transmits on the medium at a given time in order to prevent interference between competing transmissions. "Contention" refers to the circumstance in which two or more transmitting entities seek access to the shared medium at the same time. In general, contention does not necessarily implicate "collision," or interference of competing signals on the shared physical medium, but collision does indicate contention.

CSMA/CD is a contention resolution protocol which utilizes collision detection to infer contention, and is employed by Ethernet and the present invention to control access to the shared transmission medium. Ethernet controller 204 obeys the CSMA/CD protocol transmission state machine which, before transmitting, monitors the carrier sense and collision signals on shared transmission medium 106 for network activity. If another network entity (also referred to as "node") is currently transmitting on the shared medium 106, the controller 204 defers transmission until the network is quiet, and then transmits.

Once the Ethernet controller 204 detects that the shared medium 106 is idle, it begins transmission. If a collision is detected because another controller had also detected the medium to be idle and began transmission at the same time, both controllers will abort the transmission. When the Ethernet controller 204 experiences a collision during a transmission, the controller 204 switches from transmitting data to transmitting a 4-byte JAM pattern (4-bytes, all logical 1's) before ceasing transmission. The controller 204 then randomly selects a time duration to back-off before attempting to transmit again. That is, the controller 204 waits a random number of slot times (51.2 μs) determined by the "truncated binary exponential back-off algorithm" before reattempting another transmission. The first time the controller 204 detects a collision, the controller will randomly select a back-off time duration rt, where t is the slot time and r is a random integer selected from the interval $0 \leq r \leq 2^1$. If, after the selected back-off duration t has expired, the controller 204 still encounters a collision, then the controller 204 selects a new random back-off duration slot time multiple from the interval $0 \leq r \leq 2^2$. The process continues expanding the range of selection by increasing the exponent of the upper limit for the selected slot time multiple for each collision detected. Under the current standard specified in IEEE 802.3, the exponent may reach a maximum of 10. Thus, for conventional Ethernet implementations, the number of slot times which a controller delays before the nth retransmission is chosen to be a random integer r in the range of $0 \leq r \leq 2^k$, where k=min(n, 10).

In the present invention, however, the upper limit of the exponent k employed in selecting a back-off duration, and whether or not to employ a backoff algorithm, is determined by controller 204. This is a violation of the IEEE 802.3 standard requirement of an upper limit of 10, which is typically hard coded in contemporary Ethernet controllers. In the preferred embodiment, the value of exponent k is configurable, and is set in accordance with standard 802.3 requirements only during the RTC (Residual Transmission Cycle). The exponent k value is set to a maximum of 6 when the ethernet controller is attempting transmission of a Join D-Channel frame, a value selected to accommodate a worst case scenario when $2^6$ (64) network entities are attempting simultaneous Join D-Channel frame transmissions. Otherwise, the ethernet controller does not back off and immediately retransmits during the ATTC phase. The paramount benefit of conventional Ethernet controllers which employ a maximum value of 10 for the exponent k within the back-off algorithm is that collisions occurring under low traffic loads will be reattempted shortly after the collision occurs since the back-off duration is initially selected from a shorter interval t, e.g., $0 \leq t \leq 2^3 (51.2$ μs$)$ for the first three collisions. As the number of consecutive collisions (presumably resulting from higher traffic loads) for any particular transmission attempt increases, the back-off duration is selected from a wider range, thus delaying transmission attempts and increasing latency. Latency may be defined as the amount of time which a transmitter entity must wait before gaining access to a shared transmission medium. In an ordered access control scheme such as token ring, latency increases predictably with the number of stations seeking access to the shared transmission medium. In conventional Ethernet implementations, latency increase with traffic load is less predictable. However, by selecting the back-off duration from wider and wider ranges after each consecutive collision for a given transmission attempt, the conventional Ethernet controller effectively achieves a wider spread of transmission attempts as the shared medium becomes more heavily loaded. The result is automatic and deliberate increase in latency as the number of consecutive collisions increases.

The present invention effectively neuters the Ethernet truncated binary back-off algorithm during the ATTC and renders the controller 204 aggressive in the event of collision detection. During the RTC transmission sub-cycle when a new HTC-compliant network entity is attempting transmission of a Join D-Channel, the number of slot times which controller 204 delays before the nth retry of a transmission attempt is selected, for example, from the range of $0 \leq r \leq 2^k$, where $k=\min(n, 6)$. During the ATTC transmission sub-cycle, the controller 204 does not back off; after sixteen transmission attempts, however, the controller 204 will abort transmission of the packet and report an "excessive collisions" error message to driver 208.

Software driver 208 receives data frames from medium access control (MAC) protocol layer 210. Unlike typical Ethernet driver operation, where data frames are submitted to the driver in any quantity, the number of frames submitted to driver 208 for transmission is controlled by MAC layer 210. While in normal Ethernet driver implementations the layer two entity submits all of the frames which it has to transmit to the driver at once, and the driver may, in turn, buffer several or all of these frames in the DMA area before issuing a transmit command to the Ethernet controller chip, in the present invention the MAC layer 210 controls when and how many frames are submitted to driver 208, although driver 208 may still buffer frames. MAC layer 210 provides intelligent control over when and what is transmitted on shared medium 106, a feature made possible by advances in processor speeds and memory availability. MAC layer 210 employs elastic time division multiplexing (TDM) over an asynchronous multi access channel. Shared transmission medium 106 is perceived by network entities 104a-104n as composed of many virtual channels which, unlike most TDM schemes, are elastic in both number and size, either of which may increase or decrease at run time.

On top of MAC layer 210, an adaptive channel allocation protocol (ACAP) layer 212 is implemented as a logical link control (LLC) protocol. ACAP layer 212 serves as a decision theoretic agent utilizing a decision network (influence diagram) 214 to process current network loading conditions and, after determining allocation requirements and optimizing the decision network, adapting the bearer channel transmission profile by changing its transmission concentration ratio and its transmission cycle component ratios. ACAP layer 212 issues instructions in the form of primitives to MAC layer 210 to execute the results of the decision network optimization. ACAP agent 212 modifies these two values (TCR and ATTC: RTC ratio) to maximize transmission success within current network conditions. User applications 216 submit frames for transmission, together with an optional transmission profile, to ACAP agent 212 via an ACAP application program interface (API) 218. ACAP API 218 is a set of routines which access the requisite methods within ACAP agent 212, preferably maintained to a minimum of "transmit" and "receive" routines, and an optional "submit" routine providing a suggestion mechanism for user applications 216 to communicate respective future data transmission requirements.

Figure 3A:
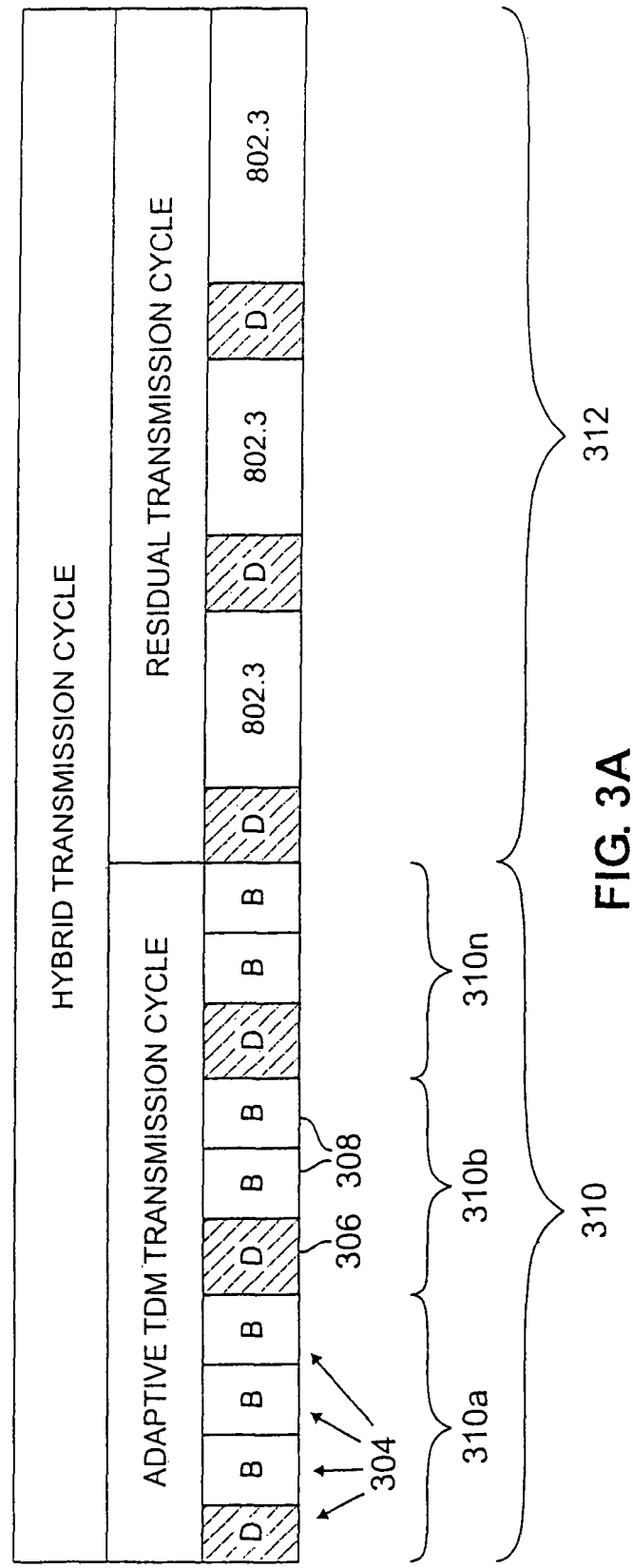
FIGS. 3A-3C depict a hybrid transmission cycle employed for transmission on a shared medium in accordance with a preferred embodiment of the present invention.
Figure 3B:
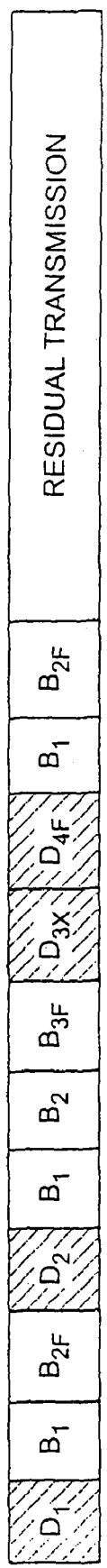
Figure 3C:
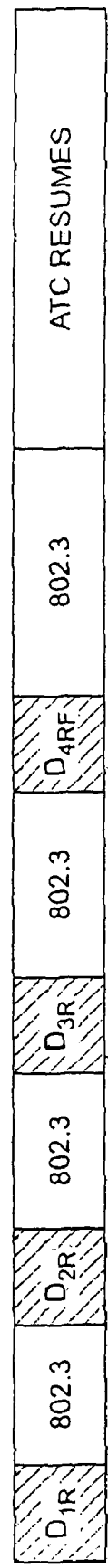

With reference now to FIGS. 3A through 3C, a hybrid transmission cycle employed for transmission on a shared medium in accordance with a preferred embodiment of the present invention is depicted. FIG. 3A is a hybrid transmission cycle (HTC) 302, the format by which network entities perceive the shared transmission medium. The medium is available for transmission only to the extent that virtual channels (VC) within the HTC 302 are idle. HTC 302 is a unit of bandwidth which is variable in size and decomposes into several virtual channels of varying sizes. The bandwidth sum of the virtual channels contained in an HTC 302 equals the total bandwidth of the HTC 302. Transmission by a network entity during an HTC 302 may only occur at the boundary of a virtual channel.

Virtual channels 304 are of two types: data link channels ("D-Channels") 306 and data bearer channels ("B-Channels") 308. D-Channels 306 serve as control and signaling channels while B-Channels 308 are payload data channels. Negotiation for B-Channel acquisition and relinquishing by a particular network entity is conducted utilizing a protocol over the D-Channel for that network entity. Thus, HTC 302 is a repeating format of virtual transmission channels which may be assigned differently from one cycle to the next based on control information exchanged over the D-Channels.

Each HTC 302 includes an adaptive TDM transmission cycle (ATTC) 310 followed by a residual transmission cycle (RTC) 312. Each ATTC 310 includes many virtual channels, and begins with one D-Channel followed by zero or more B-Channels, followed by a second D-Channel and zero of more B-Channels, and so on. D-Channels are dedicated to the exchange of control information, and each network element on the shared transmission medium will have a reserved D-Channel in the ATTC 310 of each HTC 302. A network entity wishing to retain ownership of its B-Channel position within the ATTC 310 must mandatorily transmit a transmission profile on its D-Channel. A network entity which fails to transmit a transmission profile on its assigned D-Channel is deemed to no longer exist, and its D-Channel slot is assumed by the next higher network entity. A shift left operation is performed on subsequent D-Channel slots such that the resulting ATTC 310 includes sequentially incrementing D-Channel numbers.

FIGS. 3B and 3C depict the ATTC 310 and the RTC 312, respectively, in greater detail. For the purposes of describing the invention, the designation "$D_1$" is employed to indicate D-Channel 1, "$D_2$" to identify D-Channel 2, and so on. The designation "$D_{nX}$" indicates the nth D-Channel of the transmission cycle, and also indicates that the network entity owning that virtual channel does not wish to transmit any B-Channel data at this time. The designation "$D_{nF}$" identifies the nth D-Channel in the cycle as the final D-Channel for the cycle. A designation of "$D_{nXF}$" is therefore possible. The designation of "$B_1$" identifies the first B-Channel for a given network entity, while "$B_{nF}$" indicates that the identified B-Channel is the final B-Channel for the network entity owning the transmission sub-cycle (identified by 310a, 310b, and 310n in FIG. 3). B-Channel identifiers do not include the sub-cycle identifier (e.g., as belonging to network entity "3") since that may be inferred from the context of the transmission time. The designation "$D_{1R}$" indicates the beginning of the RTC 312, and that network entity "1" is transmitting the synchronization signal described in further detail below. The designation "$D_{3RF}$" identifies the final synchronization signal in the RTC 312 portion of HTC 302.

Limitations are imposed in the present invention on both ATTC 310 and RTC 312. The maximum transmission concentration ratio (MTCR) is the ratio of B-Channel to D-Channel quantities. For instance, an MTCR of 50:1 means that every D-Channel may be immediately followed by a maximum of up to fifty B-Channels. The MTCR ensures a certain level of granularity in the transmission cycle which has acceptable performance characteristics. It would be inefficient, for example, to have 10 D-Channels (corresponding to 10 network entities) and only 10 B-Channels, at most, per D-channel, a granularity which could result in half the bandwidth being allocated to data link signaling and half allocation to payload traffic, a poor allocation scheme.

It should be noted that the MTCR is a fixed ratio serving as a limit for a transmission concentration ratio (TCR), which is the actual concentration ratio employed by a network entity. Although initially set to 50 (the limit specified by MTCR), the TCR is adaptive to network loading conditions and other factors. Run time adaption of the TCR is fundamental to adaptive transmission.

The MTCR ensures that a network entity assigned a late sub-cycle in the HTC 302 is not excessively delayed in gaining access to the shared medium. Additionally, the MAC protocol is capable of coexisting with conventional 802.3 Ethernet implementations (normal 802.3 Ethernet transmission is conducted during the RTC 312). It is necessary, therefore, that the RTC 312 appear quickly enough within the HTC 302 to avoid inducing unacceptable latency in conventional 802.3 Ethernet implementations sharing the same transmission medium. The MTCR places a maximum limit on duration of the ATTC 310. The MTCR also ensures correct acquisition of a sub-cycle by new network entities, and specifies the maximum number of network entities permitted on the network, which may be obtained from:

$$\max(NetworkEntities) = \frac{\text{Medium Data Rate}}{(1 + MTCR) * 1518}$$

where the medium data rate is specified in bytes per second and 1,518 is the maximum byte length of a conventional 802.3 Ethernet frame, while (1+MTCR) specifies one D-Channel and MTCR B-Channels per sub-cycle.

The MTCR is a preconfigured quantity, much like the maximum transmission unit (MTU) and minimum frame length employed by conventional 802.3 Ethernet implementations. However, the MTCR serves as a boundary value, with the actual TCR fluctuating at run time. The open 802.3 transmission time within the RTC 312 should be set to a ratio of the pre-configured MTCR; for an open transmission time/MTCR ratio of 1 and for an MTCR of 50, the open 802.3 transmission time will be 50 MTU transmission time. The RTC 312 should also be required to have an overall minimum length of one MTCR. No length restriction need be imposed on the length of a B-Channel save the standard 802.3 minimum frame length of 64 bytes and the maximum of 1,518 bytes.

A D-Channel within the ATTC 310 is identified by an integer number, with the first D-Channel having the identifier 1 and the second D-Channel having the identifier 2, etc. This identifier is also assigned to the network entity which acquires that D-Channel. For instance, when the shared medium is idle, as in the case of an inactive network, a network element connecting to the medium will enter a listen mode and attempt to detect D-Channel transmissions. If no D-Channel is detected, the network entity assumes itself to be the first to appear on the identifier and assigns itself an identifier of 1, claiming the first sub-cycle within the ATTC 310. Thereafter the network entity initiates an HTC 302 by transmitting a D-Channel transmission profile. Other network entities may or may not appear. If not, the sole network entity transmitting according to the adaptive MAC protocol of the present invention will result in an HTC 302 having only one transmission sub-cycle within the ATTC 310, with one D-Channel and 50 B-Channel under a default MTCR of 50 and a RTC 312 of 50 MTU, assuming a 1:1 ratio of ATTC 310 to RTC 312.

HTC 302 is a repetitive transmission lifetime consisting of one or more transmission sub-cycles within the ATTC 310 followed by the RTC 312. A sub-cycle in an ATTC 310 belongs to a particular network entity, and at the beginning of each sub-cycle a network element will declare its B-Channel allocation requirements and assignments over the D-Channel, then proceed to utilize the B-Channels accordingly. A sub-cycle thus consists of only one D-Channel and zero or more B-Channels. To extract the maximum possible benefit of the transmission profile exchange over the D-Channel, the B-Channels should be significantly greater in number and bandwidth that the D-Channels. On the other hand, the concentration ratio should not be excessive such that network entities wishing to change an allocation scheme are prevented from doing so within a reasonable amount of time.

D-Channels and B-Channels are interleaved over the full ATTC 310, each interleaved set consisting of one D-Channel and zero or more B-Channels all belonging to a particular network entity. Such interleaving improves latency for the network entities, allowing a network entity to transmit immediately after performing the transmission profile broadcast over its D-Channel and permitting other network entities to perform computation of current network conditions and belief updating in corresponding decision networks.

Transmission priorities, an important part of the adaptive MAC protocol of the present invention, are configurable by software. When priorities are not otherwise assigned to network entities, each network entity will have a priority equivalent to its D-Channel sub-cycle number within the ATTC 310, with 1 being the highest priority. Network entities are assigned a unique integer identification number, starting from 1, when joining the transmission protocol, an assignment made by the network entity itself after observing what other network entities are transmitting on the medium over the D-Channel. The network entity identifier specifies the sub-cycle within the ATTC 310 which is owned by the respective network entity. The run time network-entity identifier also serves as the network entity priority in the event that no configuration of priority is performed for the network entity. Under this default system, a network entity identifier value of 1 indicates the highest priority network entity and also means that the corresponding network entity was the first, or earliest, to appear on the medium. Network entity priority is computed as follows:

$$R_i = \frac{1}{id}$$

where $R_i$ is the priority and "id" is the network entity identifier.

When a network entity wishes to join the medium for the first time, after power up, for example, that network entity listens for D-Channel transmissions on the shared medium. Upon detecting a D-Channel transmission, the highest currently-assigned network entity identifier may be read from the transmission profile. The network entity then assigns itself the next higher network entity identifier, as described below. the network entity with an identifier value of 1 transmits on D-Channel $D_1$, the network entity with an identifier value of 2 transmits on D-Channel $D_2$, etc. Additionally, the B-Channels immediately follow the D-Channel owned by a network entity. As a result, the first transmission sub-cycle within the ATTC 310 is owned by network entity 1, the second sub-cycle is owned by network entity 2, and so on.

Since the adaptive MAC protocol of the present invention is intended to fit seamlessly into an existing deployment of conventional 802.3 Ethernet MAC, the RTC 312 is included, providing a duration of time occurring immediately following the ATTC 310 during which normal 802.3 Ethernet CSMA/CD compliant transmission occurs. Thus, during the RTC 312, the shared medium reverts to be a free-for-all just as in conventional 802.3 Ethernet implementations, and network entities employing the adaptive MAC protocol of the present invention also revert to this mode for the duration of the RTC 312. Network entities employing the adaptive MAC protocol of the present invention utilize a non-back off transmission mode during the ATTC. The adaptive MAC layer of network entities in accordance with the present invention implements the 802.3 Ethernet transmission state machine during the RTC, as described in further detail below, giving the illusion of a compliant 802.3 chipset.

Every network element on the shared medium will have a run-time designated D-Channel on which that network element is obligated to transmit. This D-Channel is employed to carry transmission profile information constructed by the network entity. At the beginning of every transmission sub-cycle within the ATTC 310, the network entity assigned to that sub-cycle constructs and transmits a transmission profile over the D-Channel, which is therefore a datalink or control information carrier over which network entities exchange transmission profile information. The transmission profile content is employed by each network entity to inform the network population of its B-Channel allocation, mainly represented by two quantities: its current TCR and its ATTC:RTC ratio. Every transmission on a virtual channel is tagged with the identity of the virtual channel in order to ensure continuous global synchronization of participating network entities. Therefore, Ethernet controller chipsets within the compliant network entities should be configured either to operate in the promiscuous mode or to accept multicast MAC addresses.

TABLE I

| Type | Name | Count | Description |
| --- | --- | --- | --- |
| byte | SourceMacAddr | 6 | Sender's physical address |
| byte | DestinationMacAddr | 6 | Multicast destination address, implementation dependent |
| word | Length/Type | 1 | 802.3 length, or Ethernet type, 0x7FF (2047) |
| word | FrameId | 1 | Identifies the global D-Channel id, and the global network element id |
| word | TotalDChannelNum | 1 | Total number of D-Channels known to this network entity |
| word | MessageGenRate | 1 | Message generation rate |
| B-ChannelProfile | Profile | 1 | Transmission requirements of network entity and status of ATTC B-Channels perceived by network entity (TCR). Count may be in the range of 0 ... TotalB-ChannelBandwidth |

Table I describes the format of a D-Channel frame in accordance with the present invention. The D-Channel frame is distinguished from conventional 802.3 Ethernet frames by the length (or "Type") field, common to both frame formats, which may contain a type identifier value, currently-unassigned (see RFC-1700), of decimal 2,047, hexadecimal 7FF. The FrameId number is placed after the type field in the D-Channel frame format, containing an encoded value indicating the D-Channel identification. After the FrameId field, the Transmission Profile is placed in the payload data area. The sequence and structure of the FrameId and Transmission Profile fields is described in Tables II and III, respectively.

TABLE II

| Bit (base zero) | Valid Values | Description |
| --- | --- | --- |
| 15 (MSB) | 1 | Final D-Channel |
|  | 0 | Non-final D-Channel |
| 14 | 1 | Synch D-Channel |
|  | 0 | Non-synch D-Channel |
| 0 ... 13 | 1 ... 16383 | D-Channel Id (channel id may not be zero) |

TABLE III

| Type | Name | Count | Description |
| --- | --- | --- | --- |
| word | TCR | 1 | 0 ... 50 Transmission Concentration Ratio for this network entity |
| word | RtcRatio | 1 | ATTC:RTC ratio for this network entity |

The most significant bit of the FrameId field is asserted if the D-Channel is a final D-Channel, with the second most significant bit being asserted if the D-Channel is a sync D-Channel transmitted during an RTC. The remaining 14 bits contain a unique D-Channel identifier, which is also the unique network entity identifier. Since zero is not a permissible identifier, the format supports $2^{14}-1=16,383$ unique identifiers.

Like the D-Channel, the B-Channel (the data bearer channel) is up to MTU bytes in size, and therefore for most implementations will be up to 1,518 bytes in length. The B-Channel is identified within the sub-cycle during which it is being transmitted, and will therefore be uniquely identified since sub-cycles are unique. B-Channels appearing at the end of a transmission sub-cycle are also identified as final B-Channels, but there are no residual B-Channels (i.e., B-Channels transmitted during an RTC) since transmission during the RTC is fully compliant, standard 802.3 Ethernet CSMA/CD transmission. B-Channels are owned by and indirectly exchanged among network entities. A newly arrived network entity is initially assigned 50 (MTCR) B-Channels along with a D-Channel and network entity identifier at the time it joins the network. In other words, a new network entity is initially assigned a full transmission sub-cycle worth of bandwidth.

The B-Channel frame format, described in Table IV, is also identified by the Length field of conventional 802.3 Ethernet frames, with a type id value (currently unassigned) of decimal 2,046 (Hexadecimal 7FE) preferably being selected. The B-Channel is essentially an 802.3 Ethernet frame with source and destination MAC addresses. Since the destination MAC address is not a multicast address as in the D-Channel's case, all network entity driver software must be initialized either to operate in the promiscuous mode or to enable multicast reception so that B-Channel transmission may be visible to those entities. This is important to maintain synchronization. The FrameId field indicates the physical space in which the B-Channel is being transmitted, an important distinction from the actual owner of the B-Channel.

TABLE IV

| Type | Name | Count | Description |
|---|---|---|---|
| byte | SourceMacAddr | 6 | Sender's physical address |
| byte | DestinationMacAddr | 6 | Unique destination address |
| word | Length/Type | 1 | 802.3 length, or Ethernet type, 0x7FE (2046) |
| word | FrameId | 1 | Identifies the global B-Channel id which identifies the current owner of the B-Channel. (Note that this B-Channel may be "borrowed" but will still bear the owner's id). |
| byte | Data | 1497 | Payload data |

TABLE V

| Bit (base zero) | Valid Values | Description |
|---|---|---|
| 31 (MSB) | 1 | Final B-Channel |
|  | 0 | Non-final B-Channel |
| 16 ... 30 (15 bits) | 1 ... 32767 | D-Channel id (or network entity currently transmitting on this B-Channel) |
| 0 ... 15 (16 bits) | 1 ... 65535 | B-Channel id within this transmission sub-cycle (channel id may not be zero) |

Within the FrameId sequence and structure, described in Table V, the most significant bit is asserted if the B-Channel is a final B-Channel. The next 15 bits indicate the D-Channel or transmission sub-cycle to which the B-Channel belongs, with the remaining 16 bits serving as a B-Channel identification number for $2^{16}-1=65,535$ unique B-Channel identifiers.

Upon connecting to the network, a network entity enters a mode in which it attempts to ascertain the status of on-going communication. Essentially, the network entity will listen for a D-Channel transmission, for a period of 50 (MTCR) MTUs in the event that the default MTCR is 50. If a D-Channel transmission is detected, then the network entity will conclude that it is not the first network entity to appear on this medium and that it must determine the global network entity identifier which it may assume. This is the lowest available network entity identifier, which is easily determined since the transmission profile allows a new network entity to determine the highest assigned D-Channel number and may then assign itself the maximum D-Channel number assigned plus 1.

As soon as the open 802.3 transmission time in the RTC begins, the new network entity will make itself known to the remaining network entities by transmitting a "Join-D-Channel" frame, indicating the network identifier which it has assigned itself. Since a collision may occur if another network entity happened to join the network during the same HTC, so this contention is resolved by implementing a back-off algorithm which is in effect during the RTC. The back-off algorithm selected differs from the standard 802.3 CSMA/CD contention resolution to gain access to the medium, since it is desirable for the network entity to access the medium in a more persistent manner.

Several timing requirements are imposed on the HTC in order to make detection and membership possible by the network entities. Every network entity transmitting a transmission profile on the D-Channel must include the total number of network entities known to be on the network, which is also the total number of D-Channels in the ATC. When the last D-Channel of the ATC is complete, all network entities transition to the RTC phase in which new network entities may join the network. When a new member network entity makes its presence known by transmitting a D-Channel during the RTC phase, it continues to utilize the RTC on an 802.3 CSMA/CD basis and does not get to transmit a sync D-Channel until the next RTC.

A network entity may also disappear from the network, a situation handled by timing. At the end of every D-Channel transmission, every network entity starts a D-Channel wait timer in order to determine whether the network entity which owns the next D-Channel is still active. If the timer expires with no transmission, the network entity which owns the next subsequent D-Channel assumes the newly disappeared network entity's identifier and will begin transmission of the D-Channel sub-cycle. The transmission wealth of the newly disappeared network entity is not assumed by any particular network entity, but is inherently allocated to the network as a whole. Dynamic D-Channel identifier reassignment requires that a shift operation be performed on the D-Channel identifier assignments. If the network entity with identifier five disappears, then network entity six assumes the identifier five, network entity seven assumes the identifier six, etc. If an inadvertent condition occurs whereby two or more network entities assume the identifier of a disappeared network entity, then the first network entity to capture the medium assumes the identifier of the disappeared network entity while the remaining network entities are bounced out to the RTC join mechanism.

Figure 4:
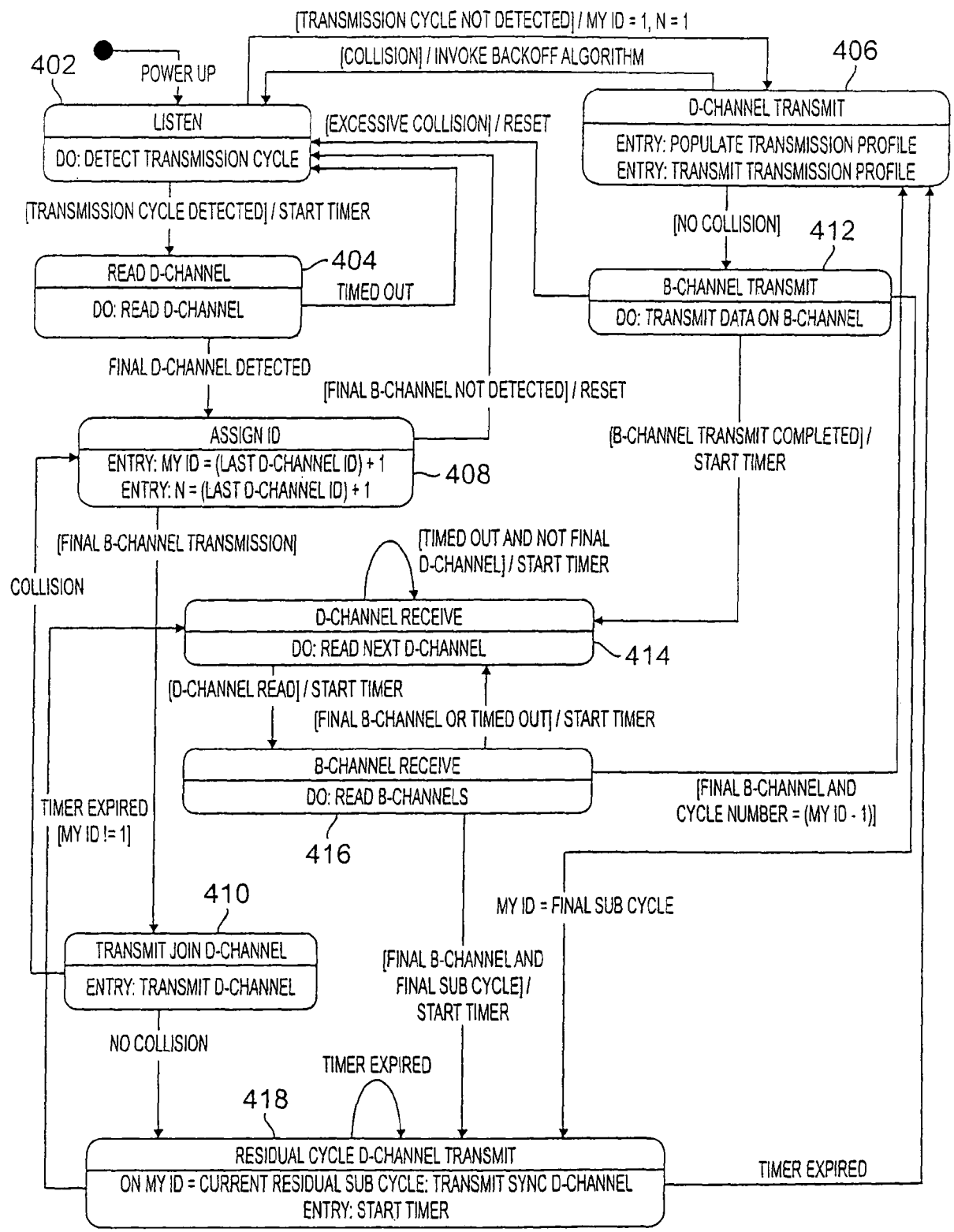
FIG. 4 is a state diagram for the medium access control (MAC) transmission protocol within a network entity in accordance with a preferred embodiment of the present invention.

Referring to FIG. 4, a state diagram for the MAC transmission protocol within a network entity in accordance with a preferred embodiment of the present invention is illustrated. The diagram shown illustrates a happy day scenario, showing the general flow of the transmission cycle detection mechanism as well as transmission within a cycle and the startup scenario with acquisition of an identifier by a network entity, but not including error conditions.

Upon startup, an network entity enters the listen state 402, in which detection of an HTC is attempted utilizing a timeout value of at least one full ATTC to ensure that sufficient time is given to account for the situation in which an HTC exists but the network entity which was supposed to be transmitting suddenly drops out of the transmission cycle. For this reason, the maximum number of network entities in the MAC protocol of the present invention is also computed to conform to the medium data rate.

While in listen state 402, the network entity attempts to identify D-Channel or B-Channel transmissions, which may be easily performed by examining the Ethernet type field specified to be decimal 2,047 for a D-Channel and decimal 2,046 for a B-Channel. If the network entity detects a frame of either the D-Channel or B-Channel type, then it transitions to the read D-Channel state 404. If, however, a timeout occurs without detection of a D-Channel or B-Channel transmission, then the network entity transitions instead to transmit D-Channel state 406.

In read D-Channel state 404, the network entity attempts to synchronize on the full HTC, meaning the network entity attempts to synchronize with the ATTC phase by identifying the D-Channel transmission sequence and reading the profiles being transmitted on the D-Channels. The network entity is informed of the current status of the network by the D-Channels transmitted by other network entities and, upon failure to synchronize onto the ATTC within a timeout period, transitions back to listen state 402.

In transmit-D-Channel state 406, the network entity formulates and transmits a D-Channel transmission profile, thus starting a transmission sub-cycle within the ATTC. If the network entity has entered the transmit D-Channel state 406 from the listen state 402, the D-Channel transmission would be the beginning of a completely new ATTC. Otherwise, the D-Channel transmission during the transmit D-Channel state 406 is merely a normal in-sequence sub-cycle transmission.

When in the read D-Channel state 404, the network entity monitors the ATTC phase transmission and, upon detection of a final D-Channel transmission, transitions to the assign identifier state 408. In the assign identifier state 408, the network entity assigns itself an identifier which is one greater than the maximum D-Channel identifier currently in the ATTC, and then awaits the final B-Channel transmission of the final sub-cycle for the current ATTC (a description of the usage of timers for this purpose, which will be understood by those in the art, is omitted for brevity). Upon detecting transmission of the final B-Channel for the last sub-cycle within the detected ATTC, the network entity transitions to the transmit join D-Channel state 410. The network is now in the RTC phase and the network entity is ready to transmit a "join" D-Channel as described above to gain membership in the HTC.

The ATTC is the interleaved transmission of one D-Channel followed by zero or more B-Channels, all originating from one network entity, then another D-Channel followed by zero or more B-Channels, all from a second network entity, and so forth. Thus, while the network is in the ATTC phase, the network entity may be in one of four possible states. In the transmit D-Channel state 406, the network entity has determined that it is now time to transmit its D-Channel frame, either because (1) no other participating network entity was detected transmitting on the shared medium or because (2) the network entity, having already gained membership and begun participating with other network entities in the HTC, detects completion of the transmission of the final B-Channel for the network entity having an identifier value which is one less than that of the subject network entity.

In either case, the network entity formulates and transmits a D-Channel frame and, upon successful transmission of the D-Channel frame, transitions to the transmit B-Channel state 412. In the transmit B-Channel state 412, the network entity formulates and transmits payload data embedded within B-Channel frames. The network entity may transmit as many B-Channels as it physically owns, up to MTCR, but should conform to the declared TCR in the D-Channel and preferably may not exceed this limit. The protocol may not accommodate situations where a network entity violates these rules and exceeds either the physical B-Channel allocation or the declared TCR.

If the network entity has no payload data to transmit, then it is obliged to transmit a D-Channel while in transmit D-Channel state 406 which indicated that no payload data (i.e., no B-Channels) are forthcoming, and transitions directly through transmit B-Channel state 412 to receive D-Channel state 414. However, if payload data is available for transmission, then the network entity transmits up to the number of physical B-Channels designated by the declared TCR in the D-Channel while in transmit B-Channel state 412. The network entity further ensures that the last B-Channel transmitted is of the type "final," which provides the go-ahead indication to the next network entity whose turn it is to transmit. Upon completing transmission of the final B-Channel, the network entity transitions to the receive D-Channel state 414 in which the network entity awaits the D-Channel transmission by the next network entity. Not only the subject network entity is expecting and awaiting the D-Channel transmission by the next participating network entity, but all other participating network entities other than that whose turn it is to transmit are expecting and awaiting the D-Channel transmission. When a D-Channel transmission is detected by the network entity while in the receive D-Channel state 414, the network entity then transitions to receive B-Channel state 416, in which the network entity expects and awaits B-Channel transmissions which end with a final B-Channel. Usage of timers for these purposes in accordance with the known art is again omitted for simplicity.

During the ATTC, the network entity alternates primarily between receive D-Channel state 414 and receive B-Channel state 416, except when its turn to transmit is reached, at which time it will transition to transmit D-Channel state 406 to or through transmit B-Channel state 412 and then, generally, back to receive D-Channel state 414 and receive B-Channel state 416. Generally, the network entity transitions out of the receive D-Channel and receive B-Channel pair of states 414 and 416 in two situations: First, if the network entity transmitting the B-Channels has an identifier one less that the identifier of the subject network entity and completes transmission of a final B-Channel, making it the subject network entity's turn to transmit a D-Channel, the network entity transitions to transmit D-Channel state 406 described earlier. Second, if a final B-Channel was received for the last sub-cycle within the ATTC (i.e., the last D-Channel transmitted was the final D-Channel for the ATTC), the network entity transitions to the transmit residual cycle D-Channel state 418.

During the RTC, the participating network entities transmit sequential and periodic sync D-Channels, which serve to demarcate the progress of time in the RTC. New network entities desiring membership in the HTC transmit their join D-Channel frames during the open 802.3 transmission time, while in the transmit join D-Channel state 410, a deliberate violation of 802.3 CSMA/CD is conducted that is intended to ensure that the new network entity gains membership within the current RTC and does not have to wait until the next RTC. However, in the event that a collision occurs during the open 802.3 transmission time, the network entity backs off in a manner similar to, but not identical with, the 802.3 back-off algorithm. The back-off algorithm for joining the HTC should preferably be far more aggressive than the standard 802.3 back-off algorithm so as to ensure successful transmission of the join D-Channel frame by the new network entity. After successful transmission of a join D-Channel frame while in the transmit join D-Channel state 410, the network entity transitions to the transmit residual cycle D-Channel state 418, where it simply monitors the RTC progress and joins in the open 802.3 transmission method. During the next ATTC, the newly joined network entity will have an opportunity to utilize its newly acquired membership in the HTC.

During the RTC which follows each ATTC, the adaptive MAC protocol of the present invention is relaxed and all network entities revert to normal 802.3 transmission. During this portion of the HTC, those network entities which are not participating in the HTC may transmit on the shared medium utilizing standard 802.3 transmission. A membership grace period, the duration of time when new HTC-compliant network entities are expected to assign themselves the next higher network entity identifier value and transmit a join D-Channel frame during the open 802.3 transmission sub-cycle, spans the RTC. Several new network entities may join the HTC during the membership grace period. If a collision occurs, the colliding network entities will utilize the back-off algorithm implemented within the MAC layer and try again at different times within the current grace period. The back-off algorithm employed in resolving collisions of join D-Channel frames should be sufficiently aggressive to allow all new network entities to join the HTC during the current grace period, even if multiple attempts are required.

The RTC is similar in structure to the ATTC, but differs in that there is no logical control of access such as the adaptive MAC protocol. Access to the shared medium for portions (or transmission sub-cycles) of the RTC are granted, as available, to the first network entity requesting access during a specific transmission sub-cycle, with contention resolution conforming to standard 802.3 CSMA/CD, including the exponent k value. The only interference to gaining access during the RTC from HTC-compliant network entities is the transmission of periodic synchronization D-Channels, or "sync D-Channels." Compliant network entities are expected to be fairly well synchronized in their timer functions after having completed the ATTC, and synchronization during the RTC is relied upon to control the transition into and out of the RTC.

The first sync D-Channel is transmitted by the compliant network entity having an identifier value of 1, with all other compliant network entities starting timers for the following 802.3 transmission sub-cycle. The duration of the 802.3 transmission sub-cycle will be proportional to an MTCR B-Channel transmission time (a multiple of the duration of 50 B-Channels if the default MTCR of 50 is utilized), and is determined by the ATTC:RTC ratio set within the decision network by the network entity transmitting the synch D-Channel. The network entity having the highest identifier value will transmit the final sync D-Channel, indicating that the next 802.3 transmission sub-cycle will be the final transmission period of the RTC and that, immediately following the TCR-based RTC duration, the network entity having the identifier value of 1 is expected to initiate a new ATTC by transmitting its D-Channel frame. Transmission of a Sync D-Channel is aggressive and is not subject to back off. The HTC network entity transmitting the Sync D-Channel will retransmit immediately upon collision detection and will not back off. Excessive collisions of the Sync D-Channel will cause loss of membership and reset to the Listen state.

The scheme described allows network entities to disappear, or unexpectedly drop out, from the RTC. If a network entity does drop out, then the timers within all other network entities, which are initially set according to the ATTC:RTC declared over the D-Channel in the ATTC by the current owner of the RTC sub-cycle, will detect the drop-out and the next network entity following the missing network entity will assume its identity. A shift operation on all network entity identifiers above the identifier of the network entity which disappeared will be performed, similar to the drop-out scenarios which may happen during the ATTC.

Since the HTC-compliant network entities are intended to coexist on the shared medium with standard 802.3 Ethernet network entities (that is, not every network entity connected to the network need be running the adaptive MAC protocol and ACAP stack of the present invention), collisions may occur with "rogue" (standard 802.3 only) network entities. A network entity detecting a collision while transmitting over the D-Channel or B-Channel during the ATTC does not back off and will reattempt transmission immediately. Excessive collisions, however, will cause loss of HTC cycle membership and a reset to the Listen state for the network element. Thus, HTC-compliant network entities will always gain access to the medium over non-HTC-compliant network entities during the ATTC, with "rogue" (non-HTC-compliant) network entities being effectively deferred until the RTC, when 802.3 compliant network entities employ the truncated binary exponential back-off algorithm in full compliance with the 802.3 standard.

Figure 5:
FIG. 5 depicts a protocol hierarchy diagram for adaptive channel allocation in accordance with a preferred embodiment of the present invention.

With reference now to FIG. 5, a protocol hierarchy diagram for adaptive channel allocation in accordance with a preferred embodiment of the present invention is depicted. The adaptive channel allocation protocol (ACAP) is implemented to efficiently utilize the B-Channels of the MAC protocol described above by exchanging messages with peer ACAPs over the D-Channels. The B-Channel resources of the MAC protocol may be viewed as network resources which, although belonging to a specific network entity at any instance in time, should not remain idle when they could be utilized by other network entities in order to optimize the efficiency of the network as a whole. Therefore, the concept of "residual" B-Channels, defined as the amount of unused B-Channels at any point within the ATTC representing excess bandwidth available to network entities transmitting within the ATTC, is introduced.

Excess B-Channel bandwidth may be left unused, simply making the RTC start earlier. However, the ACAP provides a framework for manipulating the allocation of B-Channels, and is concerned with implementation of decisions about which B-Channels to allocate and which to de-allocate. To decide the B-Channel TCR and to determine the the ATTC: RTC ratio, the ACAP may employ a Bayesian decision network utilizing microeconomic quantities to model network conditions and aid in optimization of decision making. While concepts from microeconomics are borrowed for the exemplary embodiment, the ACAP provides a framework allowing any decision network based on other principles to be employed.

The protocol hierarchy is depicted in FIG. 5 as a communication stack 502, with layers at or above the user application layer being omitted for clarity. The ACAP layer 504 is depicted as a layer two logical link control (LLC) protocol since it manages the allocation of virtual channel access among network entities. The ACAP layer 504 overlies the MAC layer 506 previously described and includes, in the exemplary embodiment, a Bayesian decision network 504a. User applications 508a-508n are also depicted and may represent entities at or above layer three. An application program interface (API) 510 is defined for the ACAP layer 504 to standardize calls between the user applications 508a-508n and the ACAP layer 504. In addition to providing a conventional "send" and "receive" interface to user applications 508a-508n, the ACAP interface 510 preferably provides a "submit" facility which may be utilized to inform the ACAP layer 504 of impending transmission requirements should such information be available to the user application. Provision of such transmission requirements beforehand is in the interest of the user application, to assist the ACAP layer 504 in negotiating for and acquiring B-Channel bandwidth in anticipation of the transmission load.

The exemplary embodiment employs an approach to channel allocation based on the notion of pareto optimality, as generally defined in microeconomics literature, with network bandwidth supply and demand modelled to yield a B-Channel allocation process which seeks to achieve pareto optimality. A performance level is considered pareto optimal herein if, and only if, there is no other achievable performance level in which the performance of one set of agents can be increased without a concomitant performance degradation for another set of agents. In application to the transmission decision network of the present invention, the key concept of pareto optimality is that network entities will only allocate B-Channels if the allocation yields a win-win situation for both the network entity and the network as a whole. A network entity will not submit to an allocation unless the resulting transmission yields a higher utility for the network entity and consequently for the network as a whole, since the subject network entity will only be able to utilize residual B-Channels in the ATTC to the extent that other network entities have not utilized their B-Channel concentration ratio.

Performance must be defined and measured on a network element basis to achieve network wide performance optimality. Performance is defined as a combination of throughput and medium utilization. Throughput is the success rate of a transmitter entity determined by the ratio of the number of successfully transmitted packets divided by the cumulative number of attempts made to transmit those packets. Utilization is the proportion of the available bandwidth which is utilized by the network entities (that is, which is not wasted to collisions). Latency, the amount of time which a transmitter entity must wait before gaining access to the medium, may also be considered as a performance measure. Optimal network performance is viewed as the performance level in which all individual network entities achieve their highest possible performance level given that they coexist in a network with other network entities, an important concept since optimal network performance does not necessarily provide the highest throughput from the medium perspective. If only 20% of all network entities are utilizing all of the medium's bandwidth capacity, medium performance may be high but network performance is obviously not optimal.

The use of Bayesian decision network 504a provides a mechanism to instill prior knowledge in the network and permits random variable (decision network node) values to be updated at run time according to fictitious transmission economy conditions. To the extent that the decision network 504a accurately depicts true economic marketplace dynamics, pareto optimality is achievable. The transmission "marketplace" is modelled using B-Channel bandwidth and network entity bandwidth requirements to compute excess demand and B-Channel price. The ACAP layer 504 utilizes the Bayesian decision network 504a when making allocation decisions regarding B-Channel bandwidth, incorporating probabilistic estimates of current marketplace conditions and transmission requirements of the subject network entity and other network entities.

The "goods" in the transmission marketplace are B-Channels, with the medium transmission speed (e.g., 10BaseT, 100BaseT, or Fiber) decoupled from the total bandwidth available using the HTC. The total bandwidth available in one ATTC is $$\text{TotalBandwidth} = B_T = N * \text{MTCR}$$

where N is the total number of network entities currently participating in the ATTC and MTCR is the maximum transmission concentration ratio. Hence, the total bandwidth of the network is the total number of B-Channels available in a transmission lifetime, allowing network entities to measure the capacity of the shared medium by the number of B-Channels which may exist within an HTC. The value assigned to MTCR is subject to the physical characteristics of the transmission medium and may be higher on high speed transmission media than for lower speed transmission media. The initial bandwidth within the ATTC belonging to a specific network entity is:

$$\overline{X}_i = \text{MTCR} = 50$$

where the bar indicates an initial value while the subscript i indicates network entity i, such that $X_i$ indicates the physical B-Channels available to the network entity i should it require transmission.

Virtual B-Channels, $V_i$, may be thought of as accumulated wealth of a network entity as a result of not transmitting on its ATTC sub-cycle, which in effect simulates a trade of B-Channels by the network entity to the network, where the network entity is paid by building up virtual B-Channels wealth. The virtual B-Channels which a network entity owns may be converted to physical B-Channels when the network entity executes an allocation decision, so:

$$\frac{V_i}{P_b} = \text{Number of } B\text{-Channels which may be allocated}$$

where $P_b$ is the current market price (in B-Channel multiples) of a B-Channel. It is noteworthy that the transmission probability is always 1.0. Since a TDM scheme is implemented over an asynchronous channel, when attempting transmission on the channel that channel is expected to be available to the network element. Furthermore, the adaptive MAC protocol of the present invention is aggressive and will not back-off exponentially as would a standard 802.3 compliant network entity.

Price in the transmission marketplace of the exemplary embodiment is defined in terms of B-Channel multiples, with a single B-Channel having a price multiple of 1.0 at startup time.

$$\overline{P}_i = 1.0 \text{ is the initial price multiple of a B-Channel}$$

At run time this multiple fluctuates up or down as determined by the excess demand in the network transmission economy. A network entity computes its perception of the value of a B-Channel in terms of B-Channel multiples or B-Channel price.

A network entity which is assigned membership in the HTC is allocated MTCR (default 50) B-Channels. This allocation of bandwidth has no explicit impact on existing members of the HTC, but results in an inherent redistribution of wealth. Before the newly arrived network entity joined the HTC, the total relative ownership of any particular network entity is:

$$\left(\frac{1}{N}\right) * B_T.$$

After the new network entity joins the HTC, the relative ownership of all participating network entities becomes:

$$\left(\frac{1}{N+1}\right) * B_T.$$

The initial B-Channel frame generation rate of a network entity is:

$$\overline{\lambda}_i = 0.0.$$

The number of B-Channels $U_i$ which are currently in use by network entity i is:

$$\overline{U}_i = 0.$$

It should be noted that:

$$\sum_{i=1}^{N} U_i \leq \sum_{j=1}^{N} X_j.$$

Network-wide total demand $D_{NET}$ for B-Channels may be computed by:

$$D_{NET} = \sum_{i=1}^{N} \Lambda_i$$

where $\Lambda_i$ is the frame generation rate of network entity i. Network-wide excess demand is computed from:

$$\Delta D_{NET} = D_{NET} - \sum_{j=1}^{N} X_j = \sum_{i=1}^{N} \Lambda_i - \sum_{j=1}^{N} X_j$$

while network entity excess demand is computed from:

$$\Delta D_{NE_i} = \Lambda_i - X_i.$$

Network-wide total B-Channel supply of unused B-Channels is computed as:

$$S_{NET} = B_T - \sum_{i=1}^{N} U_i.$$

The money supply in the transmission marketplace of the exemplary embodiment maps directly to virtual B-Channels. A network entity which de-allocates (does not utilize) physical B-Channels is paid in virtual B-Channels, such that $V_i$ for a network entity i is the amount of money which that network entity owns. When a network entity allocates B-Channels that are not assigned to it, it pays virtual B-Channels to the network, although the allocating network entity will recover costs by providing transport service to some applications residing within the network entity by requiring compensation (income) in return for transport services rendered. Applications need not be aware of this scheme, since the ACAP layer may be required to compensate itself periodically based on transport services provided to user applications.

The amount of transport service income $I_i$ for a network entity is computed as:

$$I_i = \left(R_i + \left(\frac{R_a}{10}\right)\right) * \sum B_a$$

where $R_i$ is the priority of the network entity, $R_a$ is the priority of the user application, and $B_a$ is the B-Channel utilized for the application. This implies that network entities must be assigned priorities and that applications within a network entity must also be assigned priorities. For example, a network entity may have a network-wide priority of 5, and an application within that network entity may have a priority of 2, for a combined priority of that specific application within that-particular network entity of 5.2. This translates to more income for the ACAP than if the ACAP were servicing an application with a combined priority of, say, 5.1.

A B-Channel's current market price is computed based on current network-wide excess demand and current network-wide supply, as well as a domain specific constant c:

$$\hat{P}_b = P_b * (1.0 + (c * (\Delta D_{NET} - S_{NET})))$$

From this price computation, it may be seen that if the message-driven frame generation rate $\Lambda_i$, which is represented in $\Delta D_{NET}$, goes up, then the price of a B-Channel also goes up, with the new B-Channel price being computed by the network entity from the equation above.

A network entity's initial total worth in terms of B-Channel multiples may be computed from:

$$\overline{W}_i = \overline{X}_i,$$

which implies that a network entity's worth at startup is simply the number of physical B-Channels which it owns. A history of network entity wealth may be retained to permit a network entity to exit the HTC and retain its wealth for use as its initial wealth upon rejoining the HTC. At run time, the network entity's total worth consists of its physical B-Channels and the number of B-Channels which it is able to allocate utilizing the current market price principle:

$$W_i = X_i + \left[\frac{V_i + I_i}{P_b}\right].$$

During each HTC, each network entity computes the marketplace values as described above and then proceeds to update the decision network, which may be designed and built off-line with prior probabilistic information but is updated at run time. After the network entity retrieves the optimal decision from the decision network, directives are issued to the MAC layer in the form of a D-Channel transmission profile.

Figure 6:
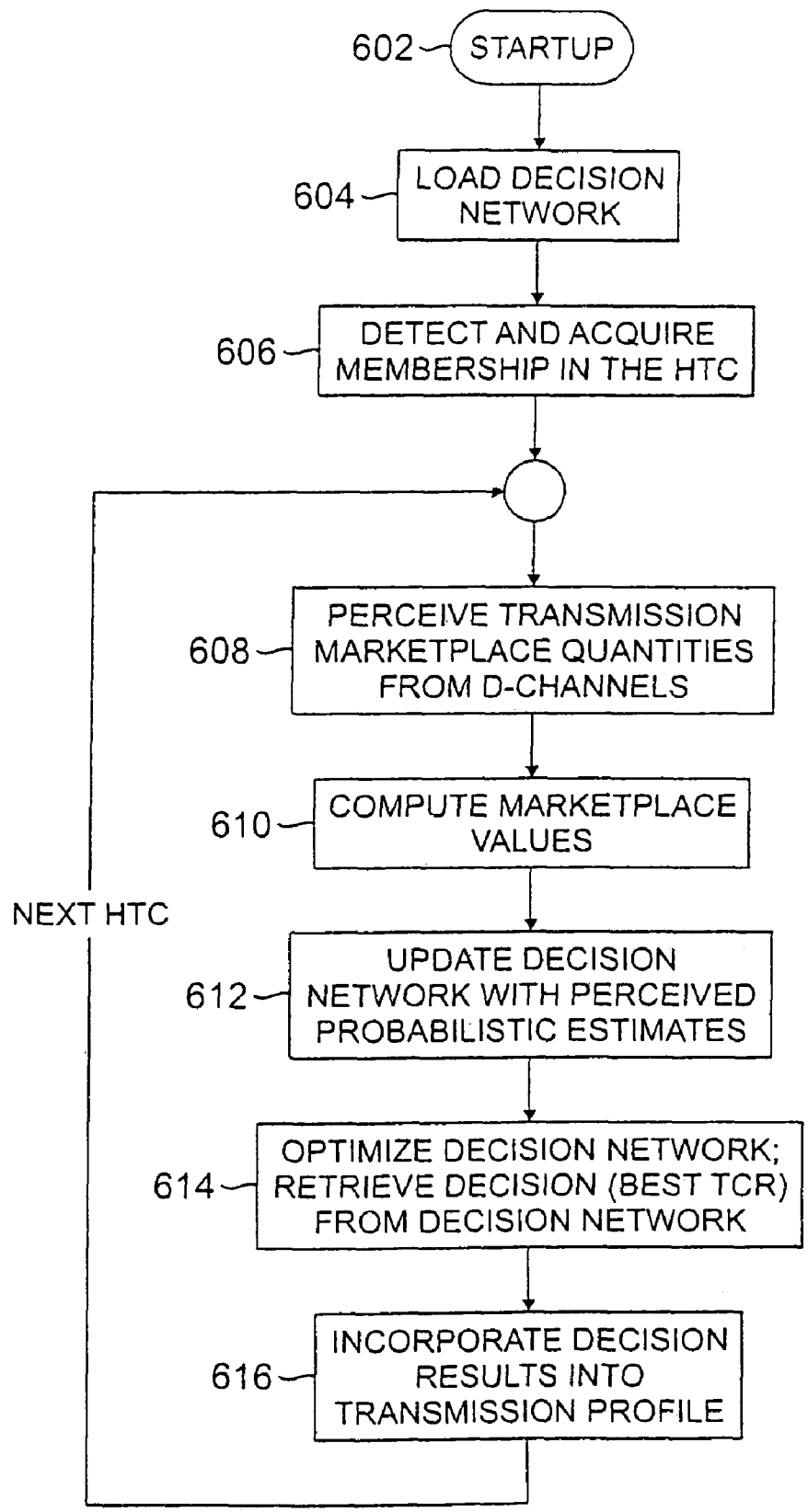
FIG. 6 is a high level flow chart summarizing a process of adaptive channel allocation in accordance with a preferred embodiment of the present invention.

Referring to FIG. 6, a high level flow chart summarizing a process of adaptive channel allocation in accordance with a preferred embodiment of the present invention is illustrated. The process is implemented within an HTC-compliant network entity as described above, and begins with step 602, which depicts start up of the network entity and/or the network entities communications with the network. The process first passes to step 604, which illustrates loading the decision network, and then to step 606, which depicts detecting and acquiring membership in the HTC. If the HTC is not detected, then an HTC is initiated by the network entity. Until HTC membership is acquired, the network entity continues to transmit according to the standard 802.3 CSMA/CD protocol.

The process next passes to step 608, which illustrates the network entity perceiving the transmission marketplace conditions from the D-Channel transmission profiles from other network entities, and then to step 610, which depicts the network entity computing marketplace values for B-Channels as described above. The process passes next to step 612, which illustrates the network entity updating the decision network based with the perceived probabilistic estimates for marketplace values, and then to step 614, which depicts the network entity optimizing the decision network and retrieving the decision—that is, the best TCR—from the decision network. The process then passes to step 616, which illustrates incorporating the result of the decision into the transmission profile for the network entity, which will then be transmitting during the network entity's assigned sub-cycle within the ATTC. The process then returns, for the next HTC, to step 608, and repeats the processes of steps 608 through 616 for each HTC until the network entity leaves the network.

Figure 7:
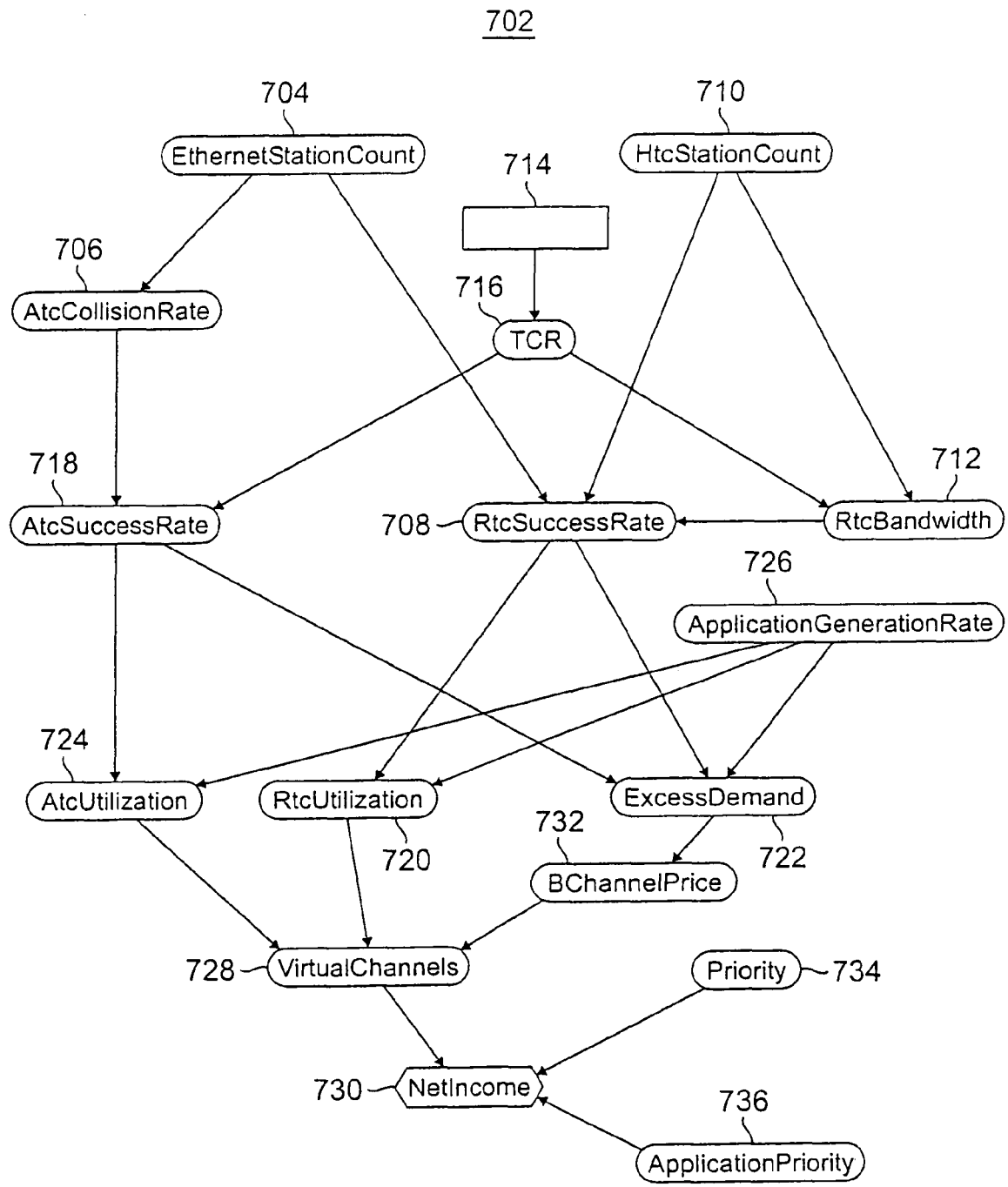
FIG. 7 depicts a decision network for adaptive channel allocation in accordance with an exemplary embodiment of the present invention.

With reference now to FIG. 7, a decision network for adaptive channel allocation in accordance with an exemplary embodiment of the present invention is depicted. The decision network may be generated off-line utilizing off-the-shelf tools, and represents the transmission marketplace as it relates to B-Channel allocation. The objective of the decision network is to decide on behalf of the ACAP agent what would be the optimal setting for the TCR and the ATTC:RTC ratio. Every network entity performs the necessary channel allocation computation, which must be implemented, updated, and optimized honestly within each network entity although the decision network gives network entities a significant degree of autonomy in reaching a decision.

The decision network of the exemplary embodiment models the transmission medium activities as marketplace quantities and is updated at run time with total supply, excess demand, and other measured (perceived) values by the ACAP agent, which then proceeds to optimize the decision network to obtain the optimal TCR and ATTC:RTC ratio for the network entity under current loading conditions. While the MAC protocol permits exchange of explicit information among network elements, this facility is not utilized in order to maintain autonomy in the network entities.

Decision networks (also referred to as "influence diagrams") are belief networks with additional node types for actions and utilities. Belief networks employ nodes to represent random variables in a domain, a quantity which represents some characteristic or entity within the domain which may have a random value yet to be determined. A node in a belief network represents a random variable, and specifically the random variable's values and the probability of the correctness of that value. Nodes are linked in influence diagrams to represent dependencies between the random variables, with the absence of a link (arc) between nodes representing conditional independence of the nodes from each other. Using Bayes' rule, this can simplify the computation for the results of a query. An arc from one node to another in a belief network signifies that the first node has a direct influence on the second, with each node including a conditional probability table quantifying the effects of the parent node(s) on the child. Belief networks are directed acyclic graphs (DAGs). Thus, a decision network in accordance with the exemplary embodiment represents state information about the domain at some instant in time and the possible actions (decisions), for determining the resulting utility of the target state if the action is taken.

The decision network 702 of the present invention includes Ethernet Station Count node 704, which represents the "rogue" network entities (standard 802.3 compliant) which may be residing and transmitting on the network. Standard 802.3 compliant network entities are not compliant with the ATTC, which implies that HTC-compliant network entities are unable to explicitly monitor D-Channel type information generated by the rogue Ethernet stations. HTC-compliant network entities may perceive the existence of rogue Ethernet stations by observing the number of collisions occurring during the ATTC or by tracking source MAC addresses. The number of 802.3 compliant Ethernet stations affects the collision rate in the ATTC, represented by Atc Collision Rate node 706, and the success rate in the RTC, represented by Rtc Success Rate node 708. The effect is typically expected to be negative, meaning that more rogue Ethernet stations results in a greater number of collisions which HTC-compliant network entities may anticipate in both phases of the HTC.

HTC Station Count node 710 represents the current count of HTC compliant network entities, which will typically but not necessarily be known for certain (new arrivals or an error in D-Channel transmissions could affect the accuracy of this value). The HTC station count directly affects how successful transmission will be in the RTC, represented by Rtc Success Rate node 708, since the HTC compliant network entities revert to standard 802.3 transmission during the RTC. Additionally, the number of HTC stations affects the length of the RTC, represented by Rtc Bandwidth node 712, since the duration of the RTC is a proportion of the current TCR.

Modify TCR node 714 is a decision node. The main objective of decision network 702 is to determine whether to modify the current TCR and, if so, by how much. Obviously, modification of the value in node 714 directly affects the value of TCR node 716, which represents the current TCR, and also affects the RTC bandwidth, represented by Rtc Bandwidth node 712, since the RTC duration is a proportion of the ATTC which is based, in turn, on the current TCR. TCR node 716 also affects the success rate in the ATTC, represented by Atc Success Rate node 718, since a higher TCR results in more time and sub-cycles in the ATTC and more opportunities to transmit B-Channels as opposed to 802.3 frames during the RTC.

Rtc Bandwidth node 712, which represents the duration of the RTC, affects the success rate within the RTC, represented by the Rtc Success Rate node 708, since a longer duration RTC, or more bandwidth allocated to the RTC, provides more opportunity to successfully transmit within the RTC. Rtc Success Rate node 708 represents how successful the network entities will be during the RTC, where success rate is measured by throughput, defined as the number of successful transmissions divided by the number of attempted transmissions. The RTC success rate directly affects the utilization rate within the RTC, represented by Rtc Utilization node 720, and also affects the excess demand in the network, represented by Excess Demand node 722, since a low success rate will cause traffic build up in the network entity and thus create a differential between queued traffic and available bandwidth for growth.

Atc Success Rate node 718 represent success (throughput) during the ATTC phase. Although all D-Channel and B-Channel transmissions will eventually prevail due to the aggressive contention resolution policy, they may be hindered by the existence of rogue 802.3 Ethernet stations. Thus, the success rate in the ATTC is affected by the collision rate due to 802.3 entities. The success rate also affects utilization of the medium during the ATTC phase, represented by Atc Utilization node 724, and the excess demand, represented by Excess Demand node 722, since a low success rate translates to queued traffic causing the differential discussed earlier.

The Application Generation Rate node 726 represents the message generation rate of local applications on the network entity, an estimate at best when the application itself submits the future anticipated message generation rate. The message generation rate affects: ATC utilization, node 724; RTC utilization, node 720; excess demand, node 722; and also, indirectly, virtual channel wealth, represented by Virtual Channels node 728. ATC utilization is affected since excessively low generation rates will not provide sufficient messages queued or available for transmission during the ATTC, a symptom observed during simulation testing described below. RTC utilization is affected for the same reason. Excess demand is affected since very high generation rates may, depending on the success rates in the ATTC and RTC, cause a backlog of messages for transmission, rendering existing bandwidth insufficient. Virtual channel wealth is affected since the message generation rate will consume the existing, available virtual channel wealth, although the relationship is not explicitly shown since it is implicit from utilization nodes.

ATC utilization is the bandwidth employed by successful transmissions during the ATTC, a ratio measure of successful bandwidth usage to total available bandwidth. ATC utilization, represented by node 724, affects virtual channel wealth, node 728, since higher utilization levels make it more likely that the network entity is accumulating income in the form of virtual channels from resident applications.

RTC utilization is the bandwidth utilized for successful transmission during an RTC phase. This affects virtual channels wealth, node 728, since more utilization increases the likelihood that the network entity is receiving virtual channels from local applications as compensation for transport services. Virtual channels wealth, node 728, represents the amount of virtual B-Channels owned by the network entity at any given time. Together with the value of B-Channel Price node 732, which represents the cost, in B-Channel multiples, of physical B-Channels at any given time, the value of node 728 determines the costs to the network entity of providing transport services to the resident application, thus affecting Net Income node 730.

The value of Excess Demand node 722, which represents the network entity's excess demand value in terms of B-Channel requirement, is affected by the network entity's message generation rate and by success rates in both the ATTC and RTC. Excess demand causes the network entity to formulate a perception of current market price. Net Income node 730 represents the compensation which the network entity may expect from local applications for transport services, income in the form of virtual B-Channels. This value provides a measure of how profitable the network entity is in providing services to resident applications on a virtual channels measure at the current B-Channel price. The value of node 730 is affected by Priority node 734, which represents the network entities priority within the network, and Application Priority node 736, which represents the priority of the application requesting transport services within the network entity. Node 730 serves as a utility node.

The utility measure of Net Income node 730 may be calculated, for example, from NetIncome(VirtualChannels, ApplicationPriority, Priority)=(100*Priority)+(10*ApplicationPriority)−(55*VirtualChannels). This utility measure is a reflection of the value of Net Income node 730. The network entity achieves maximum utility when income is high, and income is a reflection of the level of payment, or priority, of resident applications and the virtual channel repository, which reflects cost, of the network entity. Experimentation with the decision network indicates that updating nodes in the network causes the TCR ratio to be changed favorably to the utility of the network entity.

Referring to FIGS. 8A through 8K, plots from simulations of a shared transmission medium utilizing standard 802.3 compliant and/or HTC-compliant network communications under various conditions and combinations of network entities are illustrated. These simulations were run utilizing the source code listed in Appendix I and II under the well-known Netica (Netica is a trademark of Norsys Corporation) application, a product of Norsys Corporation, and Maisie, an off-the-shelf C-based discrete-event simulation tool developed by the UCLA Parallel Computing Lab.

Figure 8A:
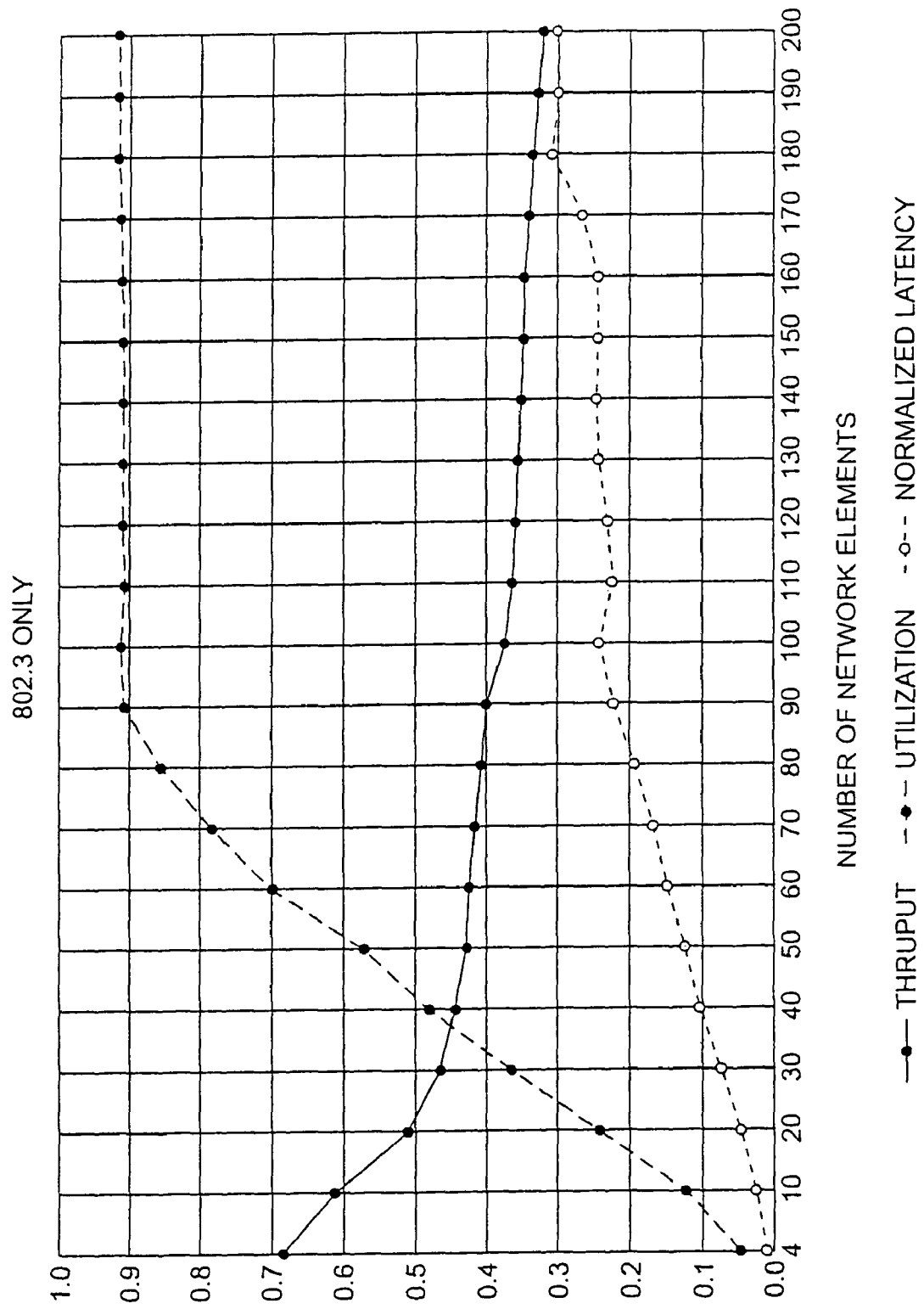

FIG. 8A is a standard 802.3 compliant only simulation providing a base performance against which to compare other simulation results. The highest throughput determined in this simulation is about 0.70, with the intersection of utilization and throughput at approximately (38, 0.45) being a reasonable operating condition. In fact, 30 is the maximum number of active stations permitted under 10Base2.

Figure 8B:
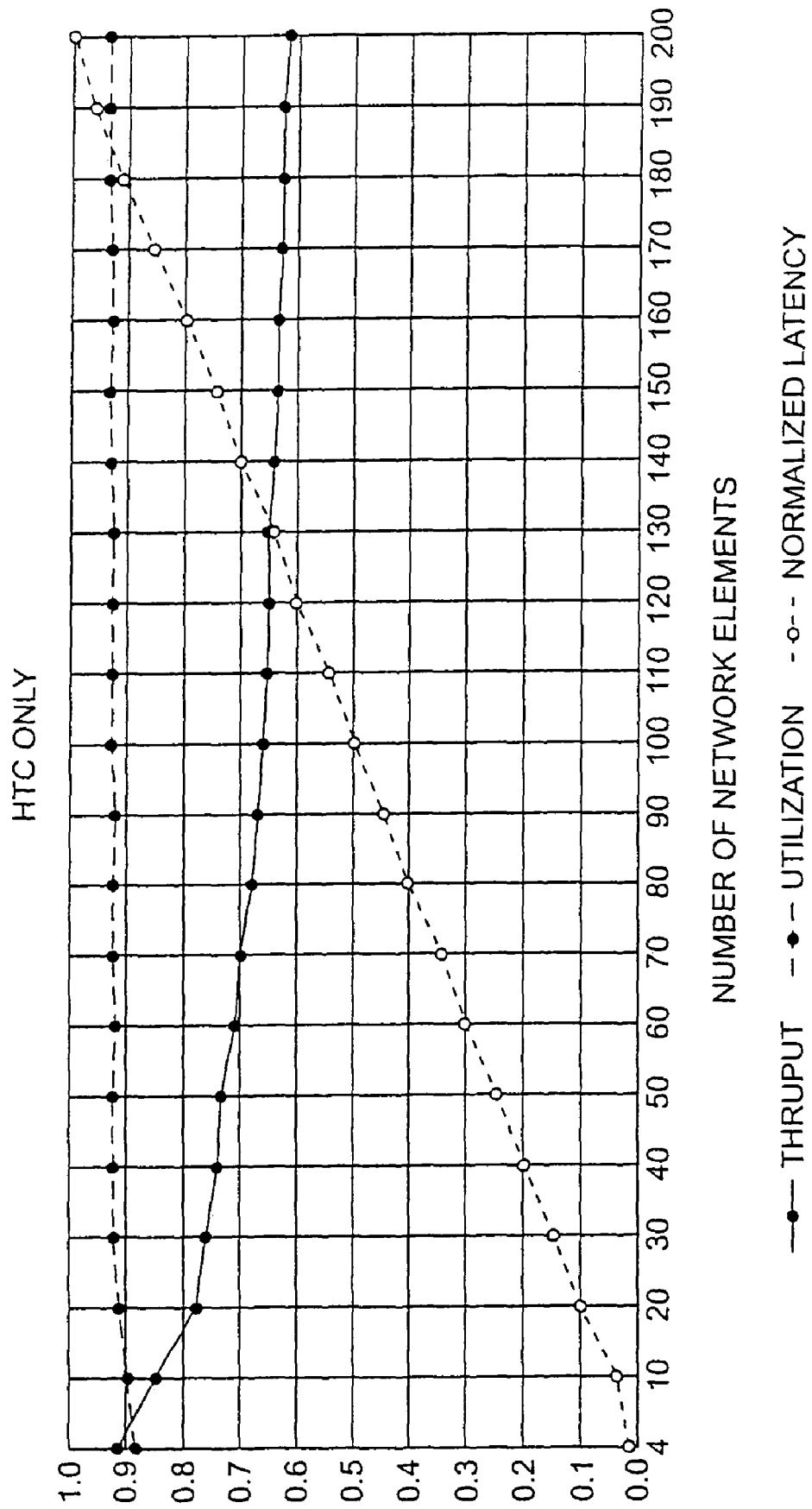

FIG. 8B is an HTC-compliant only simulation showing that throughput remains relatively high at increased network entity populations. Better throughput and utilization is reflected, with the utilization measure far exceeding the 802.3 only simulation. Throughput is actually degraded because of the RTC phase during which network entities revert to pure 802.3 transmission. Latency increases linearly with network entity population.

Figure 8C:
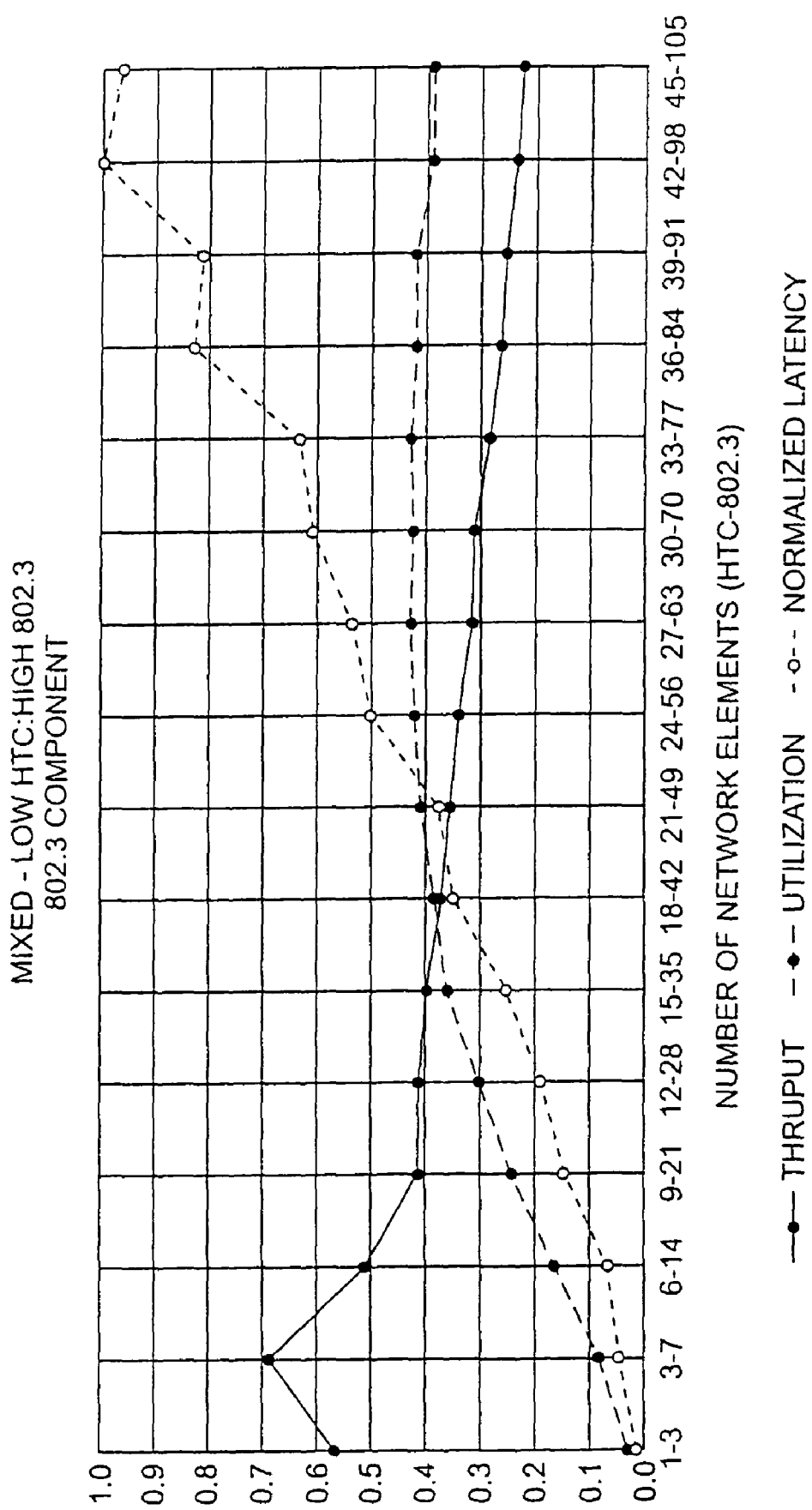
Figure 8D:
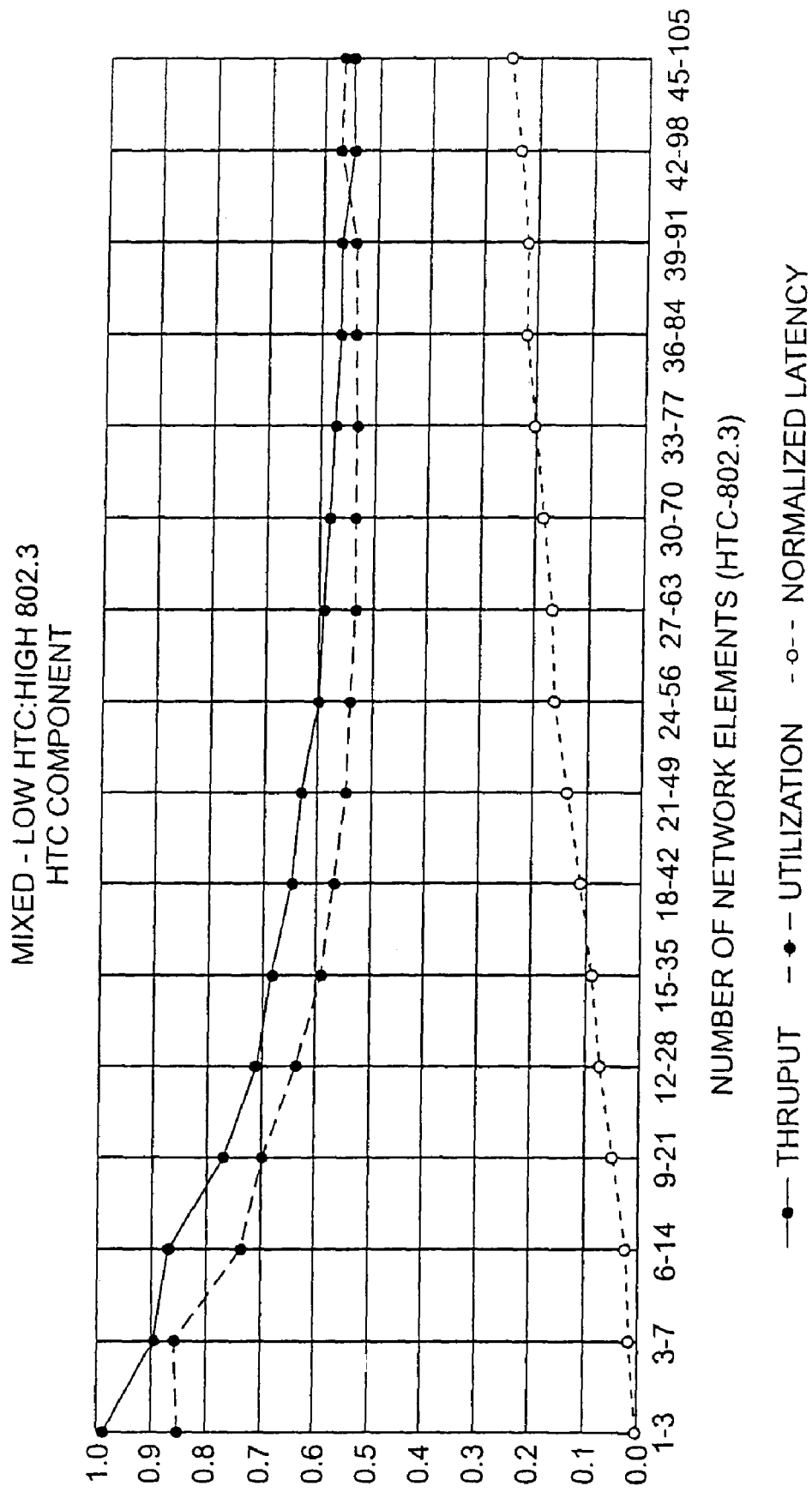
Figure 8E:
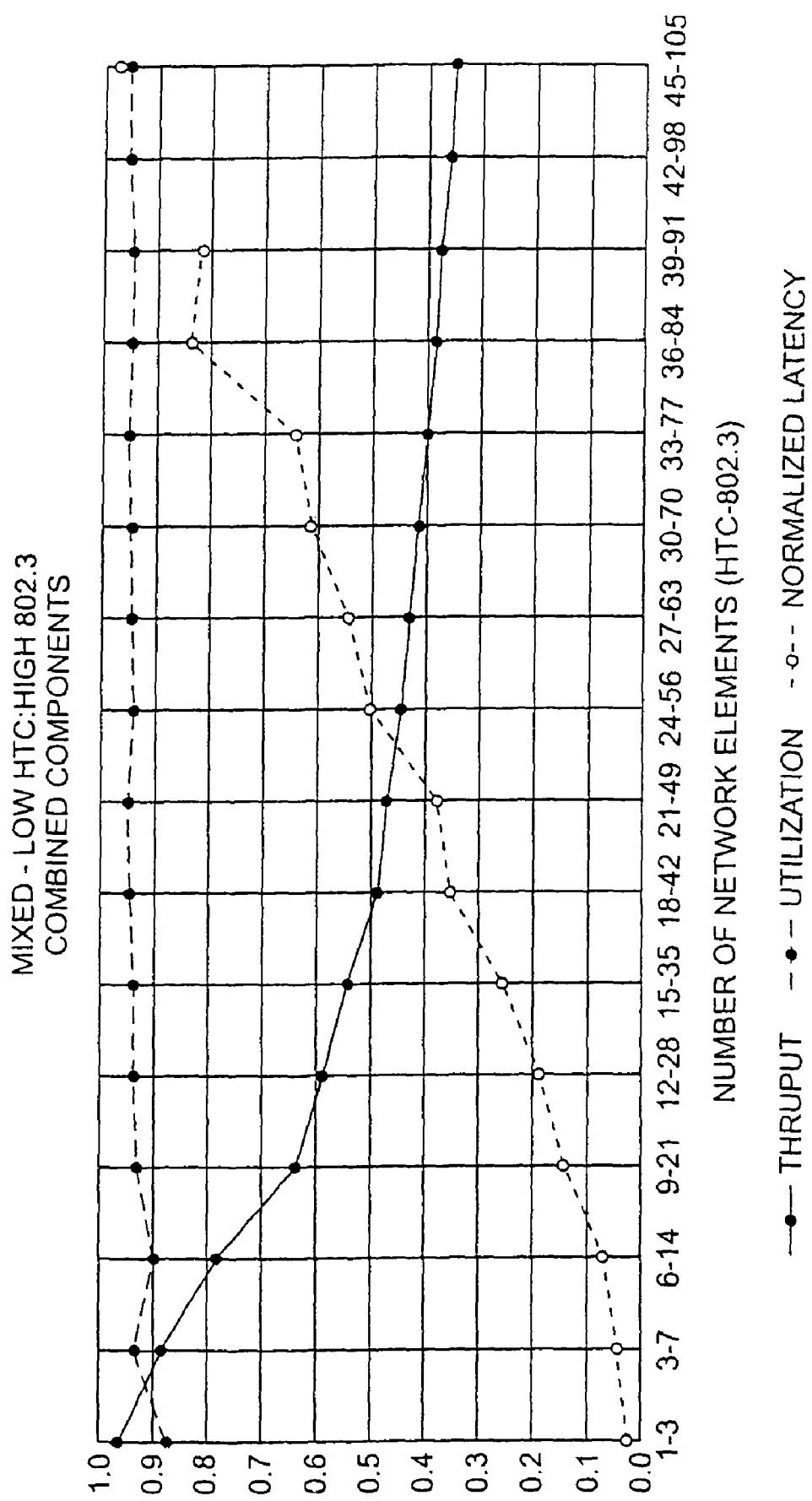

FIGS. 8C, 8D, and 8E are a mixed simulation with low HTC population and high 802.3 population. FIG. 8C simulates performance of the 802.3 components, demonstrating that 802.3 entities may perform almost as well in an HTC transmission environment as in a pure 802.3 environment. This suggests that implementing TDM sub-cycles utilizes medium bandwidth which otherwise would have found only minimal additional usage. For example, the point (21-49, 0.36) exhibits substantially the same metrics as 50 network entities in the 802.3 only simulation of FIG. 8A. FIG. 8D simulates performance of the HTC-compliant components, and shows that HTC-compliant network entities perform very well relative to an HTC-compliant only environment. Utilization in the mixed mode declines as a result of lost utilization consumed by 802.3 entities, but total utilization for both 802.3 and HTC-compliant entities, taken from FIGS. 8C and 8D, respectively, is approximately 1.0. FIG. 8E shows combined performance, and exhibits throughput comparable to pure 802.3 transmission and utilization similar to that of HTC-compliant only transmission, a favorable result indicating that TDM transmission during the ATTC extracts slack in bandwidth from 802.3 only transmission environments.

Figure 8F:
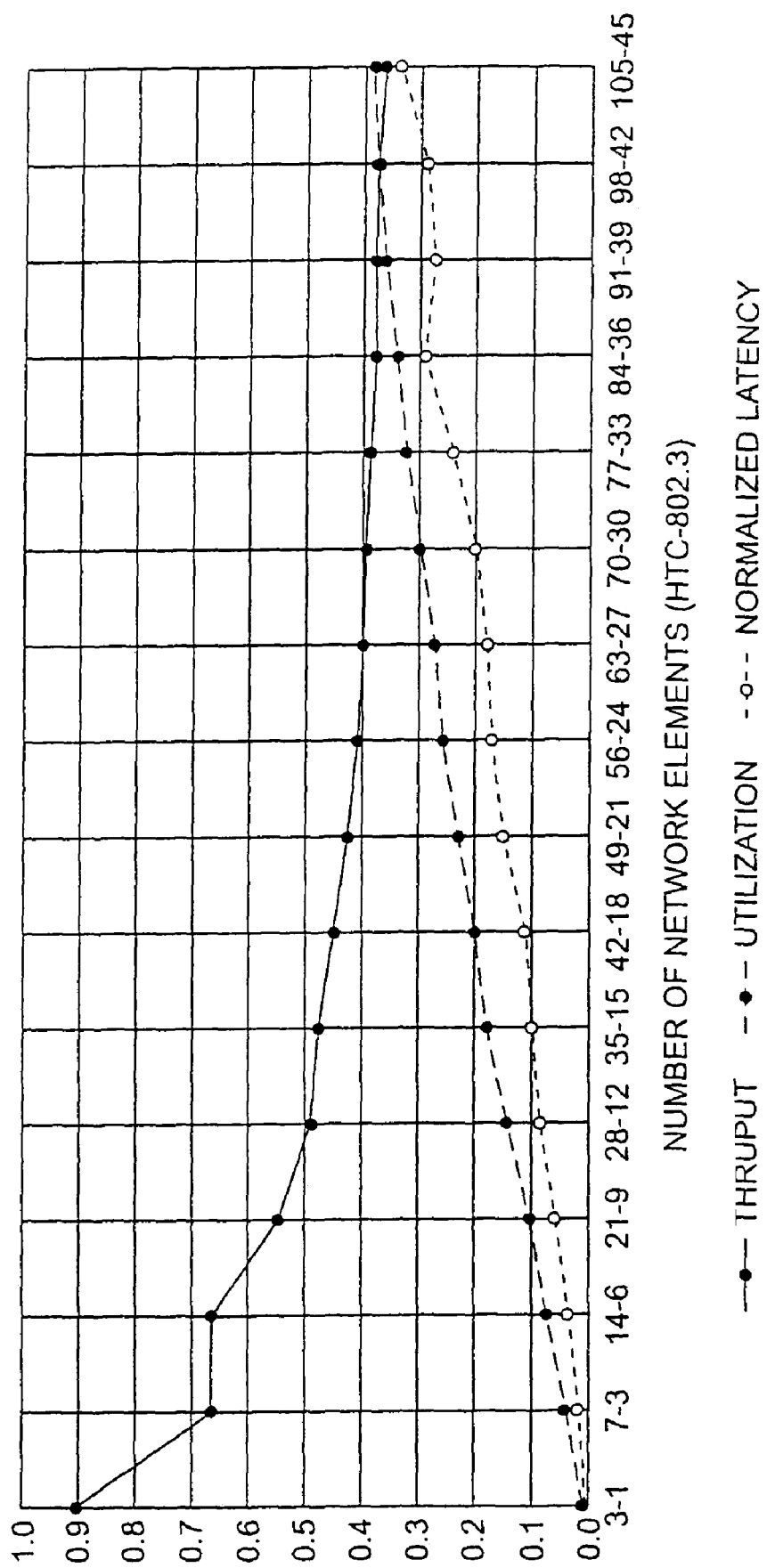
Figure 8G:
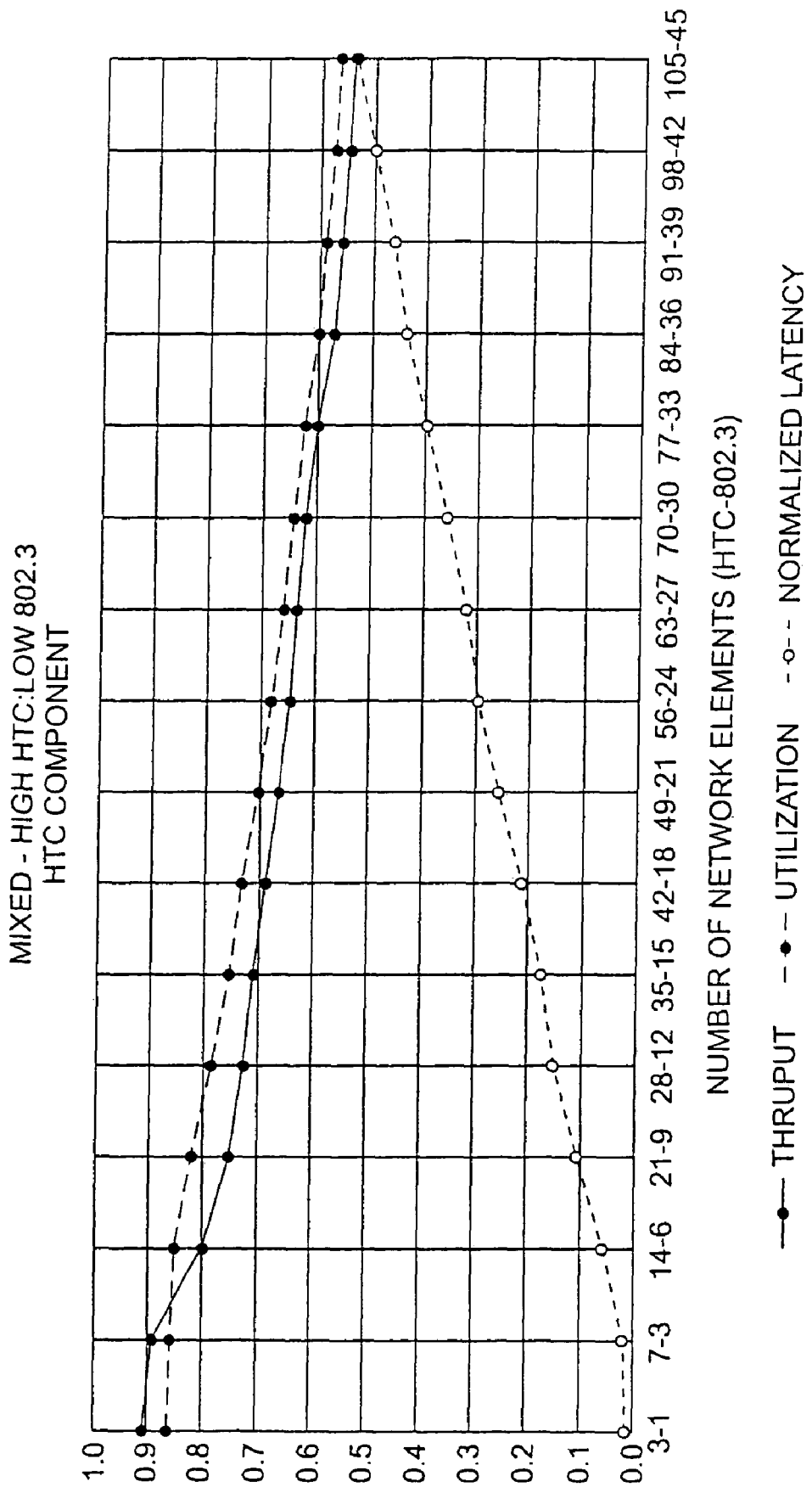
Figure 8H:
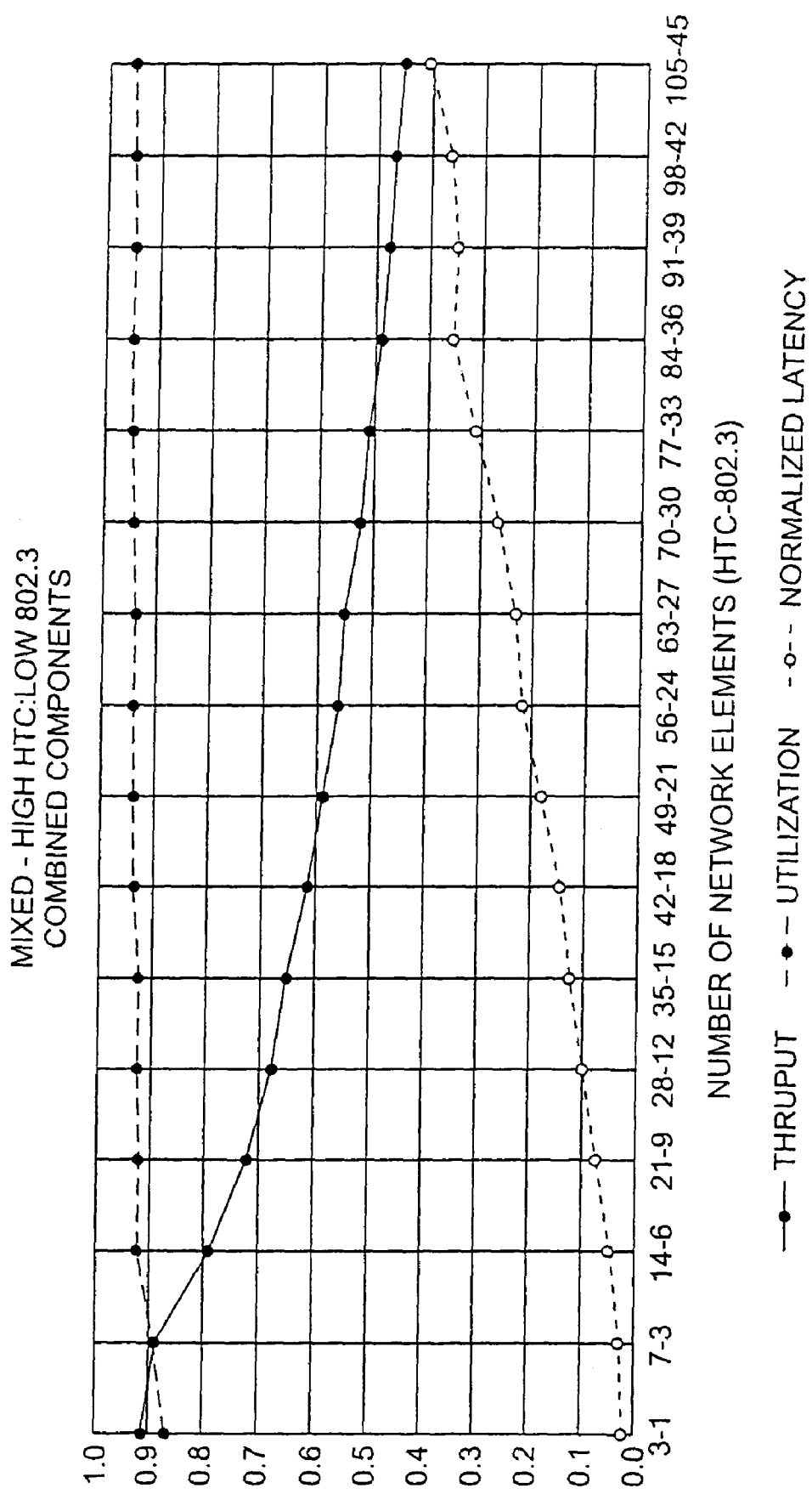
Figure 81:
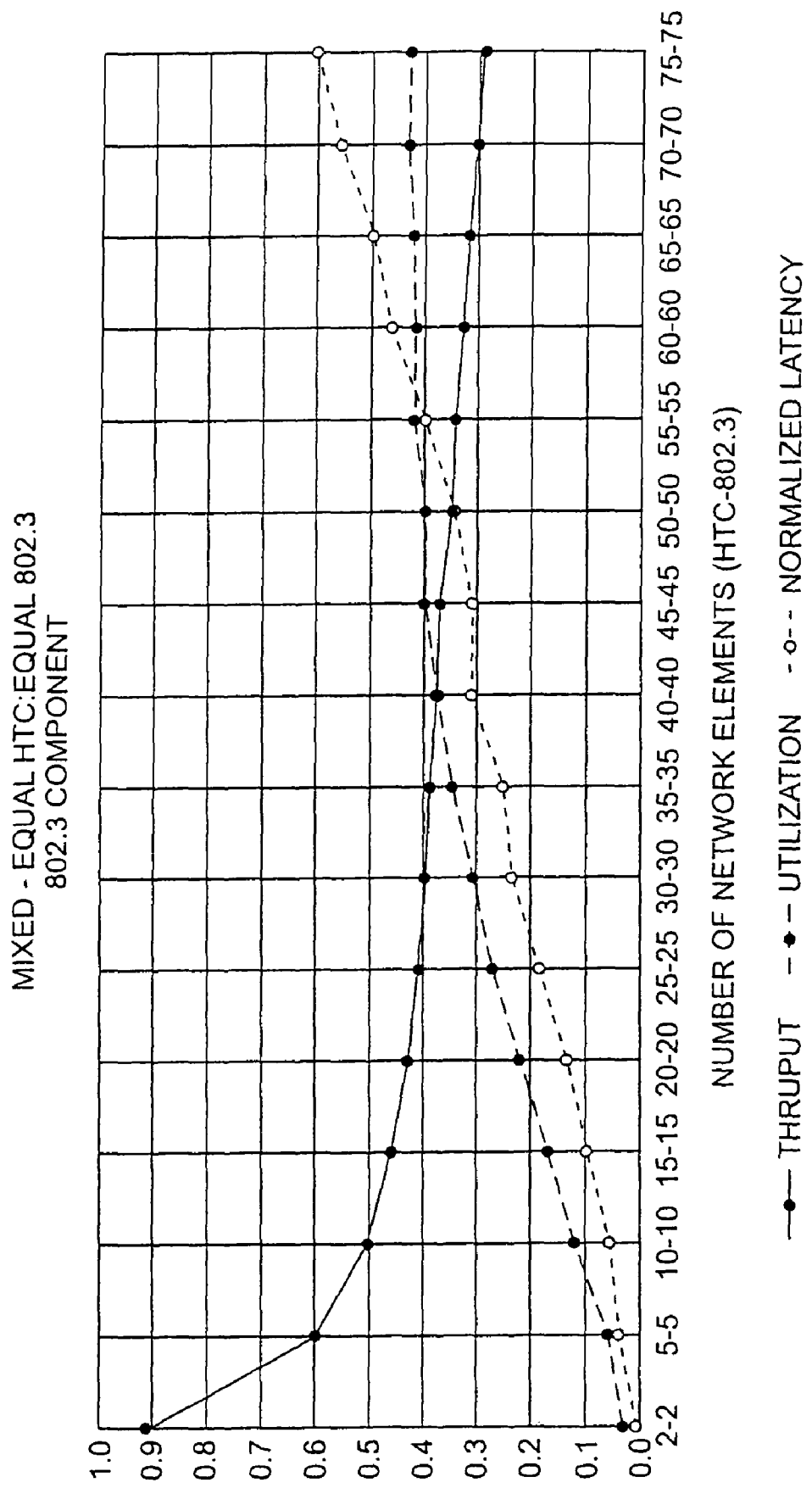

FIGS. 8F, 8G and 8H are a mixed simulation with high HTC-compliant population and low 802.3 population. Performance of 802.3 entities, shown in FIG. 8F, remains comparable to but slightly lower than the 802.3 only environment and is almost identical to the mixed environment with low HTC-compliant and high 802.3 entities shown in FIG. 8C. Comparisons made on a point by point basis—for example, the point (42-18) in FIG. 8F and point (9-21) in FIG. 8C, which is roughly the same number of 802.3 compliant entities—are probative. The performance of HTC-complaint entities, shown in FIG. 8G, improves with a higher population of HTC-compliant entities, as seen by comparing FIG. 8G with FIG. 8D. Again, point by point comparison of roughly corresponding entity numbers—e.g., point (28-12) in FIG. 8G with point (30-70) in FIG. 8D—is necessary. The combined performance of the high:low mix, illustrated in FIG. 8H, shows better overall performance than the low:high mix shown in FIG. 8E, indicating that implementation of the TDM transmission in the HTC improves overall performance.

Figure 8J:
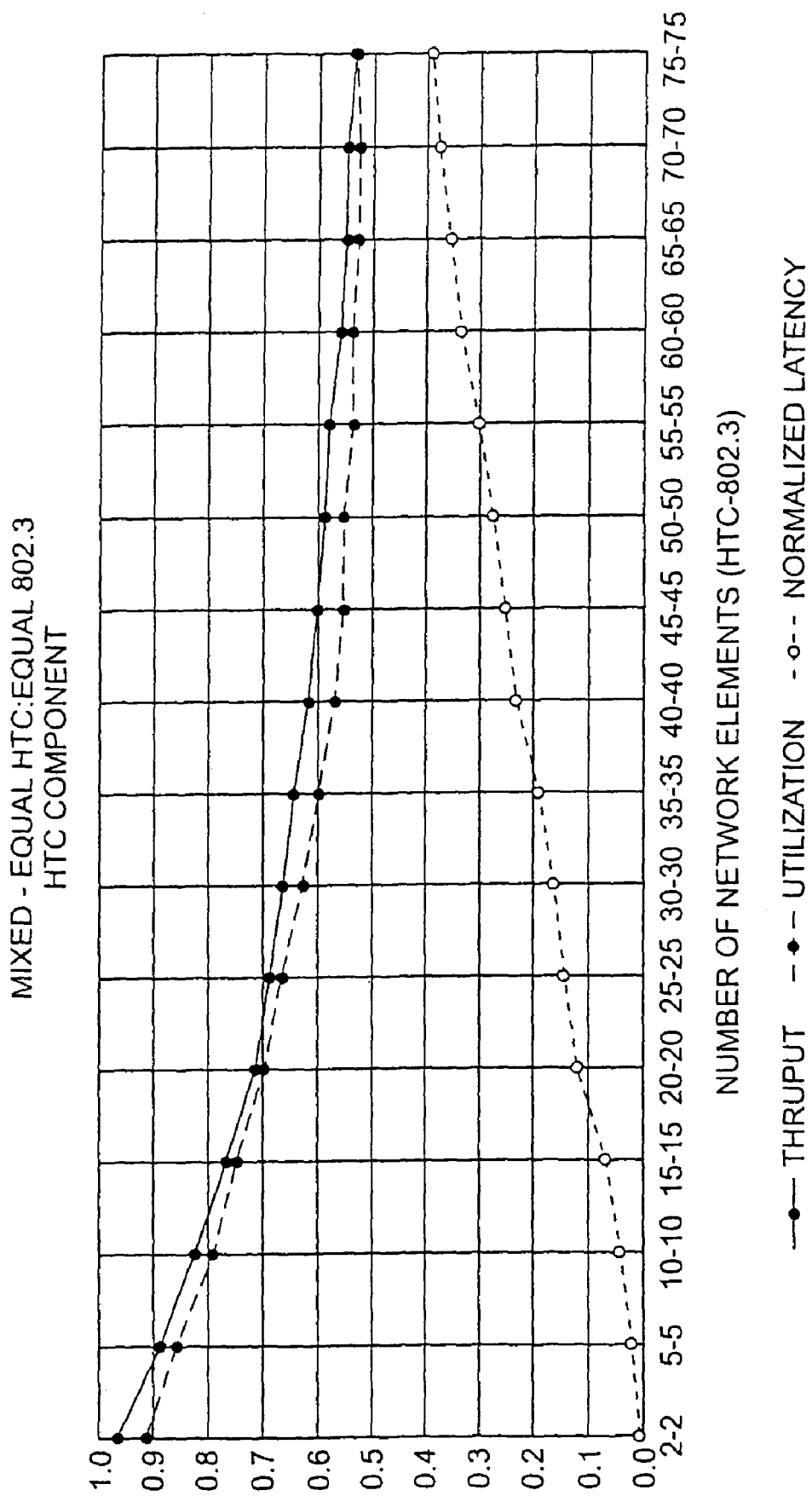
Figure 8K:
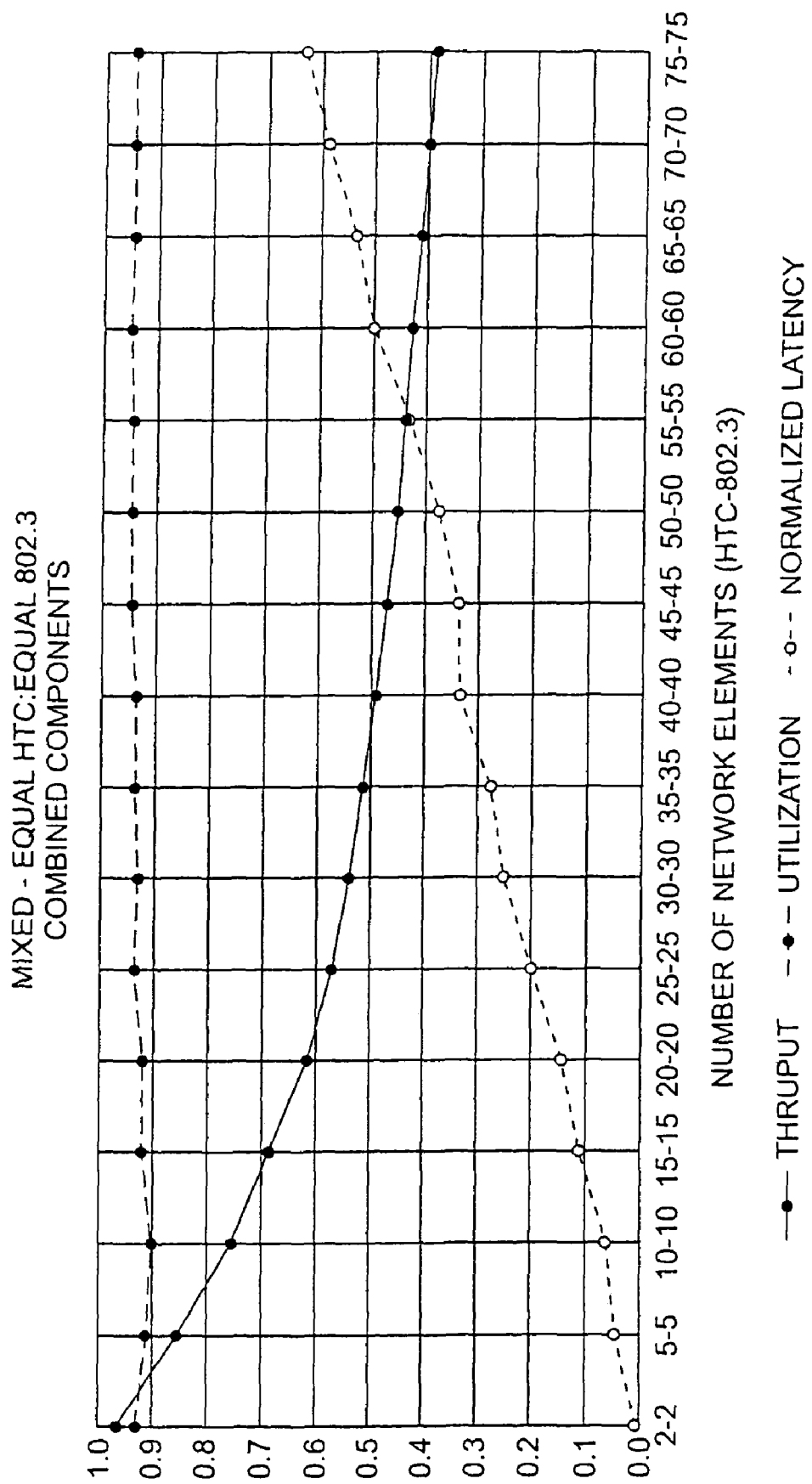

FIGS. 8I, 8J, and 8K are a mixed simulation with equal HTC-compliant and 802.3 populations. Performance of 802.3 entities, shown in FIG. 8I, is similar to high:low and low:high mixes of FIGS. 8C and 8F, respectively, with metrics being almost equal on a point by point basis. Performance of HTC-compliant entities, illustrated in FIG. 8J, is better than that in the low:high mix of FIG. 8D but worse than that in the high:low mix of FIG. 8G, an expected result since HTC transmissions will increasingly dominate under larger percentages of entities which are HTC-compliant. Combined performance, shown in FIG. 8K, indicates that network performance is not as good as under the high:low mix of FIG. 8H but better that the low:high mix of FIG. 8E, an expected result supporting the assertion that HTC transmission adds value to overall network performance.

The present invention provides a framework for implementing time division multiplexing at the medium access control layer of a network entity, a framework which interfaces with the logical link control layer in which the controlling agent resides. The agent guides the MAC in optimally accessing the medium. In the exemplary embodiment, a decision theoretic agent employing a decision network modelling the transmission network on microeconomic principles was selected, but other agents may be substituted. By representing the transmission state of the network as a transmission marketplace and iteratively optimizing the network at run time, the exemplary embodiment implements a microeconomic based decision network on the principle of pareto optimality under which the network entity allocates B-Channels for transmission only if the resulting state after the allocation is utility maximizing to the network entity and the network.

Throughput and latency degradation under increasing loading conditions resulting from increase in collisions is reduced or eliminated with the adaptive TDM of the present invention. Backwards compatibility with conventional 802.3 transmission is maintained by hybridization of the transmission cycle to include an 802.3 compliant transmission phase, which is exploited as a membership grace period for new HTC-compliant members. Priority based throughput improvement is also possible in the present invention, which provides a framework for any type of decision agent or network.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of communication over a shared transmission medium, comprising:
   defining a transmission cycle having a first portion and a second portion which are alternately repeated by defining an adaptive time-division multiplexing transmission cycle portion and a residual transmission cycle portion;
   allocating a part of the first transmission cycle portion to each of a plurality of network entities employing the shared transmission medium; and
   allocating parts of the second transmission cycle portion as available to network entities employing the shared transmission medium based on primacy of requests for access to the shared transmission medium.

2. The method of claim 1, wherein the step of allocating a part of the first transmission cycle portion to each of a plurality of network entities employing the shared transmission medium further comprises:
   allocating a logical link channel within the first transmission cycle portion to each network entity employing the shared transmission medium and participating in a communication protocol apportioning the first transmission cycle portion among all participating network entities in an ordered sequence of participating network entities.

3. The method of claim 1, wherein the step of allocating a part of the first transmission cycle portion to each of a plurality of network entities employing the shared transmission medium further comprises:
   allocating zero or more data payload channels within the first transmission cycle portion to each network entity employing the shared transmission medium and participating in a communication protocol apportioning the first transmission cycle portion among all participating network entities.

4. The method of claim 3, wherein the step of allocating zero or more data payload channels within the first transmission cycle portion to each network entity employing the shared transmission medium and participating in a communication protocol apportioning the first transmission cycle portion among all participating network entities further comprises:
   allocating data payload channels to each participating network entity based on loading conditions.

5. The method of claim 1, wherein the step of allocating a part of the first transmission cycle portion to each of a plurality of network entities employing the shared transmission medium further comprises:
   allocating parts of the first transmission cycle portion to each of a subset of network entities employing the shared transmission medium without allocating any part of the first transmission cycle portion to network entities employing the shared transmission medium without participating in the communication protocol.

6. The method of claim 1, wherein the step of allocating parts of the second transmission cycle portion as available to network entities employing the shared transmission medium based on primacy of requests for access to the shared transmission medium further comprises:
   allocating access to the shared transmission medium to network entities employing the shared transmission medium as requested with network entities backing off upon collision detection.

7. The method of claim 6, wherein the step of allocating parts of the second transmission cycle portion as available to network entities employing the shared transmission medium based on primacy of requests for access to the shared transmission medium further comprises:
   allocating access to the shared transmission medium during the second transmission cycle portion in compliance with the IEEE 802.3 to any network entity regardless of whether that network entity participates in a communication protocol apportioning the first transmission cycle portion among all participating network entities.

8. The method of claim 1, wherein the step of allocating parts of the second transmission cycle portion as available to network entities employing the shared transmission medium based on primacy of requests for access to the shared transmission medium further comprises:
   allocating access to the shared transmission medium to IEEE 802.3 compliant network entities.

* * * * *

UNITED STATES PATENT AND TRADEMARK OFFICE
CERTIFICATE OF CORRECTION

PATENT NO. : 7,719,981 B2  Page 1 of 1
APPLICATION NO. : 10/884641
DATED : May 18, 2010
INVENTOR(S) : Wael Hani Ghanma and Jerry W. Sessom It is certified that error appears in the above-identified patent and that said Letters Patent is hereby corrected as shown below:

Column 1, line 7, after "reference" insert the following -- , and further claims priority to U.S. Provisional Patent Application Serial No. 60/121,897 filed February 26, 1999. --

Signed and Sealed this

Seventeenth Day of August, 2010

David J. Kappos
*Director of the United States Patent and Trademark Office*